US 8,036,979 B1

(12) United States Patent
Torrez et al.

(10) Patent No.: US 8,036,979 B1
(45) Date of Patent: Oct. 11, 2011

(54) SYSTEM AND METHOD FOR GENERATING A FINANCE ATTRIBUTE FROM TRADELINE DATA

(75) Inventors: Luz M. Torrez, Fountain Valley, CA (US); Adam Thomas Kornegay, Knoxville, TN (US)

(73) Assignee: Experian Information Solutions, Inc., Costa Mesa, CA (US)

( * ) Notice: Subject to any disclaimer, the term of this patent is extended or adjusted under 35 U.S.C. 154(b) by 511 days.

(21) Appl. No.: 11/973,300

(22) Filed: Oct. 5, 2007

Related U.S. Application Data

(60) Provisional application No. 60/849,542, filed on Oct. 5, 2006.

(51) Int. Cl.
*G06Q 40/00* (2006.01)
(52) U.S. Cl. ........................................................ 705/38
(58) Field of Classification Search ...................... 705/38
See application file for complete search history.

(56) References Cited

U.S. PATENT DOCUMENTS

| | | | |
|---|---|---|---|
| 3,316,395 A | 4/1967 | Lavin | |
| 4,774,664 A | 9/1988 | Campbell et al. | |
| 4,812,628 A | 3/1989 | Boston et al. | |
| 4,872,113 A | 10/1989 | Dinerstein | |
| 4,947,028 A | 8/1990 | Gorog | |
| 5,201,010 A | 4/1993 | Deaton et al. | |
| 5,239,462 A | 8/1993 | Jones et al. | |
| 5,274,547 A * | 12/1993 | Zoffel et al. | 705/38 |
| 5,521,813 A | 5/1996 | Fox et al. | |
| 5,583,763 A | 12/1996 | Atcheson et al. | |
| 5,611,052 A | 3/1997 | Dykstra et al. | |
| 5,649,114 A | 7/1997 | Deaton et al. | |
| 5,659,731 A | 8/1997 | Gustafson | |
| 5,692,107 A | 11/1997 | Simoudis et al. | |
| 5,696,907 A | 12/1997 | Tom | |
| 5,699,527 A | 12/1997 | Davidson | |
| 5,802,142 A | 9/1998 | Browne | |
| 5,819,226 A | 10/1998 | Gopinathan et al. | |
| 5,870,721 A | 2/1999 | Norris | |
| 5,878,403 A | 3/1999 | DeFrancesco | |
| 5,884,287 A | 3/1999 | Edesess | |
| 5,907,828 A | 5/1999 | Meyer et al. | |

(Continued)

FOREIGN PATENT DOCUMENTS

EP 1122664 8/2001

(Continued)

OTHER PUBLICATIONS

Business Wire_2000 "Instant Access to Credit Reports Now Available Online with DMS' CreditBrowser; Browser-based system also Simplifies credit Decisioning and Offers a Central Point of Control", p. 0264, May 23, 2000, Newswire; Trade.*

(Continued)

*Primary Examiner* — Alexander Kalinowski
*Assistant Examiner* — Edward Chang
(74) *Attorney, Agent, or Firm* — Knobbe, Martens, Olson & Bear, LLP

(57) ABSTRACT

Embodiments of a system and method are described for generating a finance attribute. In one embodiment, the systems and methods retrieve raw tradeline data from a plurality of credit bureaus, retrieve industry code data related to each of the plurality of credit bureaus, determine one or more tradeline leveling characteristics that meet at least one pre-determined threshold, and generate a finance attribute using the selected leveling characteristics.

17 Claims, 19 Drawing Sheets

U.S. PATENT DOCUMENTS

| | | |
|---|---|---|
| 5,926,800 A | 7/1999 | Baronowski et al. |
| 5,930,776 A | 7/1999 | Dykstra et al. |
| 5,933,813 A | 8/1999 | Teicher et al. |
| 5,940,812 A | 8/1999 | Tengel et al. |
| 5,953,707 A | 9/1999 | Huang et al. |
| 5,966,699 A | 10/1999 | Zandi |
| 5,970,478 A | 10/1999 | Walker et al. |
| 5,995,947 A | 11/1999 | Fraser et al. |
| 6,018,723 A | 1/2000 | Siegel et al. |
| 6,029,149 A | 2/2000 | Dykstra et al. |
| 6,073,140 A | 6/2000 | Morgan et al. |
| 6,088,686 A | 7/2000 | Walker et al. |
| 6,119,103 A * | 9/2000 | Basch et al. ............. 705/35 |
| 6,129,273 A | 10/2000 | Shah |
| 6,144,948 A | 11/2000 | Walker et al. |
| 6,185,543 B1 | 2/2001 | Galperin et al. |
| 6,208,979 B1 | 3/2001 | Sinclair |
| 6,236,977 B1 | 5/2001 | Verba et al. |
| 6,269,325 B1 | 7/2001 | Lee et al. |
| 6,311,169 B2 | 10/2001 | Duhon |
| 6,321,205 B1 | 11/2001 | Eder |
| 6,330,546 B1 | 12/2001 | Gopinathan et al. |
| 6,374,230 B1 | 4/2002 | Walker et al. |
| 6,385,594 B1 | 5/2002 | Lebda et al. |
| 6,393,406 B1 | 5/2002 | Eder |
| 6,405,181 B2 | 6/2002 | Lent et al. |
| 6,430,539 B1 | 8/2002 | Lazarus et al. |
| 6,457,012 B1 | 9/2002 | Jatkowski |
| 6,513,018 B1 | 1/2003 | Culhane |
| 6,542,894 B1 | 4/2003 | Lee et al. |
| 6,587,841 B1 | 7/2003 | DeFrancesco |
| 6,597,775 B2 | 7/2003 | Lawyer et al. |
| 6,598,030 B1 | 7/2003 | Siegel et al. |
| 6,611,816 B2 | 8/2003 | Lebda et al. |
| 6,782,390 B2 | 8/2004 | Lee et al. |
| 6,823,319 B1 | 11/2004 | Lynch et al. |
| 6,839,682 B1 | 1/2005 | Blume et al. |
| 6,850,606 B2 | 2/2005 | Lawyer et al. |
| 6,865,566 B2 | 3/2005 | Serrano-Morales et al. |
| 6,873,979 B2 | 3/2005 | Fishman et al. |
| 6,959,281 B1 | 10/2005 | Freeling et al. |
| 6,965,889 B2 | 11/2005 | Serrano-Morales et al. |
| 7,152,053 B2 | 12/2006 | Serrano-Morales et al. |
| 7,181,427 B1 | 2/2007 | DeFrancesco |
| 7,200,602 B2 | 4/2007 | Jonas |
| 7,275,083 B1 | 9/2007 | Seibel et al. |
| 7,340,424 B2 | 3/2008 | Gang et al. |
| 7,340,434 B2 | 3/2008 | Schnall |
| 7,346,576 B2 | 3/2008 | Lent et al. |
| 7,366,694 B2 | 4/2008 | Lazerson |
| 7,379,913 B2 | 5/2008 | Steele et al. |
| 7,383,215 B1 | 6/2008 | Navarro et al. |
| 7,428,509 B2 | 9/2008 | Klebanoff |
| 7,433,855 B2 | 10/2008 | Gavan et al. |
| 7,472,088 B2 | 12/2008 | Taylor et al. |
| 7,505,939 B2 | 3/2009 | Lent et al. |
| 7,556,192 B2 | 7/2009 | Wokaty, Jr. |
| 7,571,139 B1 | 8/2009 | Giordano et al. |
| 7,580,856 B1 | 8/2009 | Pliha |
| 7,590,589 B2 | 9/2009 | Hoffberg |
| 7,610,257 B1 | 10/2009 | Abrahams |
| 7,653,592 B1 | 1/2010 | Flaxman |
| 7,668,769 B2 | 2/2010 | Baker et al. |
| 7,672,865 B2 | 3/2010 | Kumar et al. |
| 2001/0039523 A1 | 11/2001 | Iwamoto |
| 2002/0023051 A1 | 2/2002 | Kunzle et al. |
| 2002/0072975 A1 | 6/2002 | Steele et al. |
| 2002/0077964 A1 | 6/2002 | Brody et al. |
| 2002/0099641 A1 | 7/2002 | Mills et al. |
| 2002/0128960 A1 | 9/2002 | Lambiotte et al. |
| 2002/0147669 A1 | 10/2002 | Taylor et al. |
| 2002/0147695 A1 | 10/2002 | Khedkar et al. |
| 2003/0018549 A1 | 1/2003 | Fei et al. |
| 2003/0033242 A1 | 2/2003 | Lynch et al. |
| 2003/0036996 A1 | 2/2003 | Lazerson |
| 2003/0041031 A1 * | 2/2003 | Hedy ............. 705/51 |
| 2003/0046223 A1 | 3/2003 | Crawford et al. |
| 2003/0065563 A1 | 4/2003 | Elliott et al. |
| 2003/0078877 A1 | 4/2003 | Beirne et al. |
| 2003/0097329 A1 | 5/2003 | Nabe et al. |
| 2003/0195830 A1 | 10/2003 | Merkoulovitch et al. |
| 2003/0208412 A1 | 11/2003 | Hillestad et al. |
| 2003/0212618 A1 | 11/2003 | Keyes et al. |
| 2003/0216965 A1 | 11/2003 | Libman |
| 2003/0217003 A1 | 11/2003 | Weinflash et al. |
| 2003/0233323 A1 | 12/2003 | Bilski et al. |
| 2004/0030667 A1 | 2/2004 | Xu et al. |
| 2004/0039686 A1 | 2/2004 | Klebanoff |
| 2004/0044615 A1 | 3/2004 | Xue et al. |
| 2004/0044617 A1 | 3/2004 | Lu |
| 2004/0054619 A1 | 3/2004 | Watson et al. |
| 2004/0064402 A1 | 4/2004 | Dreyer et al. |
| 2004/0107125 A1 | 6/2004 | Guheen et al. |
| 2004/0111363 A1 | 6/2004 | Trench et al. |
| 2004/0128229 A1 | 7/2004 | Raines et al. |
| 2004/0163101 A1 | 8/2004 | Swix et al. |
| 2004/0177030 A1 | 9/2004 | Shoham |
| 2004/0193535 A1 | 9/2004 | Barazesh |
| 2004/0215553 A1 | 10/2004 | Gang et al. |
| 2004/0215554 A1 | 10/2004 | Kemper et al. |
| 2004/0215555 A1 | 10/2004 | Kemper et al. |
| 2004/0215556 A1 | 10/2004 | Merkley, Jr. et al. |
| 2004/0225594 A1 | 11/2004 | Nolan, III et al. |
| 2004/0225597 A1 | 11/2004 | Oppenheimer et al. |
| 2005/0027632 A1 | 2/2005 | Zeitoun et al. |
| 2005/0065874 A1 | 3/2005 | Lefner et al. |
| 2005/0086579 A1 | 4/2005 | Leitner et al. |
| 2005/0102226 A1 | 5/2005 | Oppenheimer et al. |
| 2005/0125350 A1 | 6/2005 | Tidwell et al. |
| 2005/0130704 A1 | 6/2005 | McParland et al. |
| 2005/0144067 A1 | 6/2005 | Farahat et al. |
| 2005/0154664 A1 | 7/2005 | Guy et al. |
| 2005/0187860 A1 | 8/2005 | Peterson et al. |
| 2005/0209922 A1 | 9/2005 | Hofmeister |
| 2005/0228748 A1 | 10/2005 | Togher et al. |
| 2005/0251820 A1 | 11/2005 | Stefanik et al. |
| 2005/0278246 A1 | 12/2005 | Friedman et al. |
| 2005/0279824 A1 | 12/2005 | Anderson et al. |
| 2006/0004731 A1 | 1/2006 | Seibel et al. |
| 2006/0041443 A1 | 2/2006 | Horvath |
| 2006/0059073 A1 | 3/2006 | Walzak |
| 2006/0080233 A1 | 4/2006 | Mendelovich et al. |
| 2006/0080251 A1 | 4/2006 | Fried et al. |
| 2006/0100954 A1 | 5/2006 | Schoen |
| 2006/0129428 A1 | 6/2006 | Wennberg |
| 2006/0155639 A1 | 7/2006 | Lynch et al. |
| 2006/0173772 A1 | 8/2006 | Hayes et al. |
| 2006/0178983 A1 | 8/2006 | Nice et al. |
| 2006/0242039 A1 | 10/2006 | Haggerty et al. |
| 2006/0242046 A1 | 10/2006 | Haggerty et al. |
| 2006/0242049 A1 | 10/2006 | Haggerty et al. |
| 2006/0242050 A1 | 10/2006 | Haggerty et al. |
| 2006/0242051 A1 | 10/2006 | Haggerty et al. |
| 2006/0267999 A1 | 11/2006 | Cash et al. |
| 2006/0282359 A1 | 12/2006 | Nobili et al. |
| 2006/0293932 A1 | 12/2006 | Cash et al. |
| 2006/0293979 A1 | 12/2006 | Cash et al. |
| 2007/0016520 A1 | 1/2007 | Gang et al. |
| 2007/0030282 A1 | 2/2007 | Cash et al. |
| 2007/0067297 A1 | 3/2007 | Kublickis |
| 2007/0106582 A1 | 5/2007 | Baker et al. |
| 2007/0192165 A1 | 8/2007 | Haggerty et al. |
| 2007/0214076 A1 | 9/2007 | Robida et al. |
| 2007/0226093 A1 | 9/2007 | Chan et al. |
| 2007/0226130 A1 | 9/2007 | Haggerty et al. |
| 2007/0244732 A1 | 10/2007 | Chatterji et al. |
| 2007/0255654 A1 | 11/2007 | Whipple et al. |
| 2007/0255655 A1 | 11/2007 | Kemper et al. |
| 2007/0282736 A1 * | 12/2007 | Conlin et al. ............. 705/38 |
| 2007/0288271 A1 | 12/2007 | Klinkhammer |
| 2008/0015979 A1 | 1/2008 | Bentley |
| 2008/0046351 A1 | 2/2008 | Wiener et al. |
| 2008/0059317 A1 | 3/2008 | Chandran et al. |
| 2008/0065569 A1 | 3/2008 | Dutt et al. |
| 2008/0120155 A1 | 5/2008 | Pliha |
| 2008/0228635 A1 | 9/2008 | Megdal et al. |
| 2008/0027094 A1 | 10/2008 | Lent et al. |

| | | | |
|---|---|---|---|
| 2008/0255897 | A1 | 10/2008 | Megdal et al. |
| 2008/0294540 | A1 | 11/2008 | Celka et al. |
| 2009/0018996 | A1 | 1/2009 | Hunt et al. |
| 2009/0044279 | A1 | 2/2009 | Crawford et al. |
| 2009/0222308 | A1 | 9/2009 | Zoldi et al. |
| 2010/0145836 | A1 | 6/2010 | Baker et al. |

FOREIGN PATENT DOCUMENTS

| | | |
|---|---|---|
| JP | 2003-016261 | 1/2003 |
| TW | 256569 | 6/2006 |
| WO | WO 99/04350 | 1/1999 |
| WO | WO 99/46710 | 9/1999 |
| WO | WO 01/41355 | 6/2001 |
| WO | WO 01/75754 | 10/2001 |
| WO | WO 03/101123 | 12/2003 |
| WO | WO 2004/114160 | 12/2004 |
| WO | WO 2007/149941 | 12/2007 |
| WO | WO 2008/076343 | 6/2008 |

OTHER PUBLICATIONS

Business Wire_2004 "PremierGuide Announces Release 3.0 of Local Search Platform", p. 5574, Mar. 4, 2004, Newswire; Trade.*

Business Wire_2000 "Instant Access to Credit Reports Now Available Online with DMS' CreditBrowser; Browser-based system also Simplifies credit Decisioning and Offers a Central Point of Control", p. 0264, May 23, 2000, Newswire; Trade.*

Business Wire_2004 "PremierGuide Announces Release 3.0 of Local Search Platform", p. 5574, Mar. 4, 2004, Newswire; Trade.*

PR Newswire, "Experian-Scorex Announces New Credit Simulation Tool", p. NA, Jun. 13, 2005, Supplier Number: 133176110.*

Burr Ph.D., Sara et al., "Utility Payments as Alternative Credit Data: A Reality Check", Asset Builders of America, Inc.

Card Marketing, Use the Latest CRM Tools and Techniques, www.CardForum.com, vol. 5 No. 10, Dec. 2001.

Cowie, Norman E., Warning Bells & "The Bust-Out", Business Credit, Jul. 1, 2000.

Custom Strategist and Qualifile.

Downes, et al., Dictionary of Finance and Investment Terms, Fifth Edition, pp. 332-333.

Dymi, Amilda, Need for Leads Spurs Some Upgrades, Copyright 2008, Source Media Inc. p. 24 vol. 17 No. 8, May 2008.

eFunds Corporation, Data & Decisioning, Debit Report, http://www.efunds.com/web/industry-solutions/financial-services/fr...

eFunds Introduces Qualifile.

Fair Isaac Introduces Falcon One System to Combat Fraud, Business Wire, May 5, 2005.

Fair Isaac Offers New Fraud Tool, National Mortgage News & Source Media, Inc., Jun. 13, 2005.

Hakan Polatoglu et al., European Journal of Operational Research 108 (1998) 170-183, Theory and Methodology, "Probability distributions of cost, revenue and profit over a warranty cycle", Dec. 1996.

International Preliminary Report for PCT/US2008/064594, Dec. 10, 2009.

International Search Report for PCT/US2007/06070, Nov. 10, 2008.

International Search Report for PCT/US2007/63822, Sep. 11, 2007.

International Search Report for PCT/US2007/63823, Oct. 24, 2007.

International Search Report for PCT/US2007/63824, Oct. 9, 2007.

Jacob, Katy et al., The Center for Financial Services Innovation, A Case Study of Checking Account Inquiries and Closures in Chicago, Nov. 2006.

Tackling The Issue of Bust-Out Fraud, Retail Banker International, Jul. 24, 2007.

Webpage printed from <http://www.magnum.net/pdfs/RapUpBrochure.pdf.> On Mar. 4, 2008.

Zoot's Decision Engine, www.zootweb.com/decision_engine.html.

Zoot's Instant Rules GUI, www.zootweb.com/instant_rules_GUI.html.

Zoot's Pre-Built Standard Attributes, www.zootweb.com/credit_attributes.html.

Zoot's Rules Management GUI, www.zootweb.com/business_rules_GUI.html.

* cited by examiner

200

| FIRM NAME | MEMBER NUMBER | CS | ------TRADE------ | | BAL | HICR | | ECOA | |
|---|---|---|---|---|---|---|---|---|---|
| OPEN RPTD | DLA | | | | TERM | PHR1 | PHR2 | PHR3 | |
| NARRATIVE CODE | | | | | | PASTDUE | | 24 MONTH HISTORY | |
| | | | | | | MAX DEL | | | |
| NORTHEAST CREDIT UNION 170FCXXXX | | | I1 | | 1912 | 2015 | 4(011) 3(010) 5(012) | | |
| 06/1998 12/2002 | 12/2002 | | MR (30-60-90+) | | 38 | | ******4355432322**** | | |
| FE:CREDIT CARD | | | | | | 03-03-04 | | | |

202

| SUB NAME | INDCODE | OPENED | ------TRADE------ | | TERMS | MAXDELQ | PAYPAT I-12 | | MOP |
|---|---|---|---|---|---|---|---|---|---|
| REMARK CODE | LOAN TYPE | VERIFIED | HIGHCD | | PASTDUE | AMT-MOP | PAYPAT I324 | | |
| ECOA | | CLSD/PD | CREDLIM | | | | MO 30/60/90 | | |
| | | | BALANCE | | | | | | |
| NORTHEAST CREDIT UNION Q | | 06/1998 | 2015 | | MIN 0000 | 05 | 111111111153 | | R01 |
| | | 12/2002 | 2000 | | 0 | | 554323221IXX | | |
| I | CC:CREDIT CARD | | 1912 | | | | 03/03/04 | | |

204

| SUBSCRIBER | | | | | OPEN | ------TRADE------ | | AMT-TYP2 | PYMT STATUS |
|---|---|---|---|---|---|---|---|---|---|
| SUB# | KOB | TYPE | TRM | ECOA | BALDATE | AMT-TYP1 | | PYMT LEVEL | PYMT HISTORY |
| ACCOUNT# SPCMT | | | | | LAST PAY | BALANCE | | PAST DUE | BY MONTH |
| | | | | | | MONTH PAY | | | |
| NORTHEAST CREDIT UNION | | | | | 06/1998 | 2015(L) | | 2245(H) | 40- CUR WAS 150 |
| 1700XXX | FC | 18 | REV | 1 | 11/2002 | 1912 | | 02/2002 | BCCCCCCGC325 |
| | | | | | 10/2002 | 38 | | | 432121ICCCCC |

| | |
|---|---|
| F | Finance |
| FA | Auto financing co. |
| FB | Mortgage brokers |
| FC | Credit unions |
| FF | Sales financing co. |
| FI | Investment firms |
| FL | S & L mortgage |
| FM | Mortgage co. |
| FP | Personal loan co. |
| FR | Mortgage reporters |
| FS | S & L companies |
| FZ | Misc. finance co. |
| E | Education |
| EB | Business ed. |
| EC | Colleges |
| EL | Student loans |
| ET | Technical ed. |
| EU | Universities |
| EV | Vocational & trade schools |

302

| | |
|---|---|
| F | Finance |
| FA | Auto financing co. |
| FB | Mortgage brokers |
| FC | Credit unions |
| FF | Sales financing co. |
| FI | Investment firms |
| FL | S & L mortgage |
| FM | Mortgage co. |
| FP | Personal loan co. |
| FR | Mortgage reporters |
| FS | S & L companies |
| FZ | Misc. finance co. |

304

| | |
|---|---|
| F | Personal Finance |
| Q | Finance other than personal |

FIG. 3

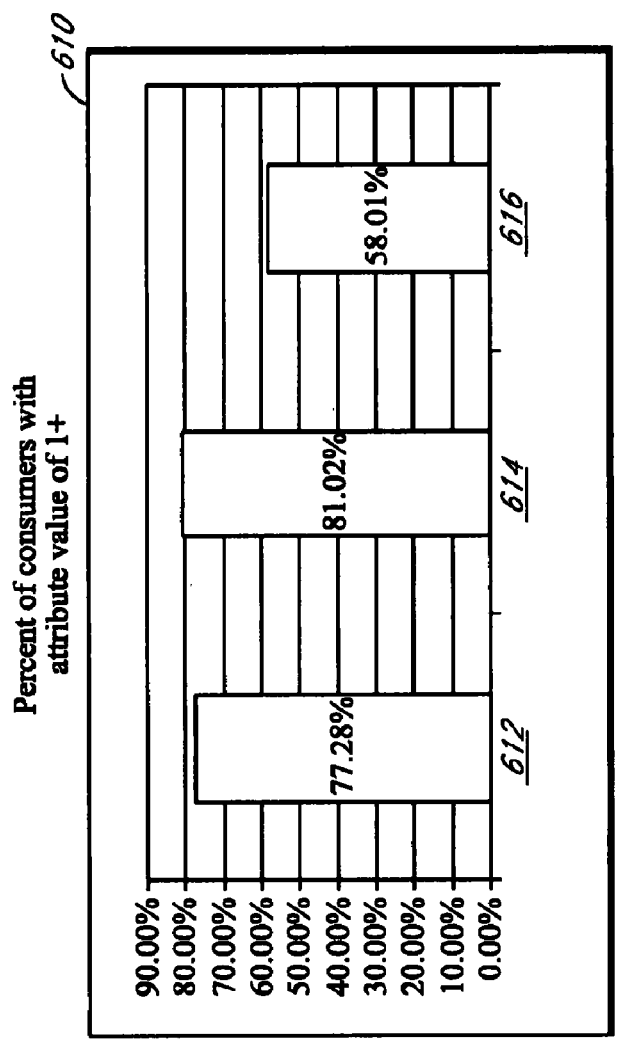
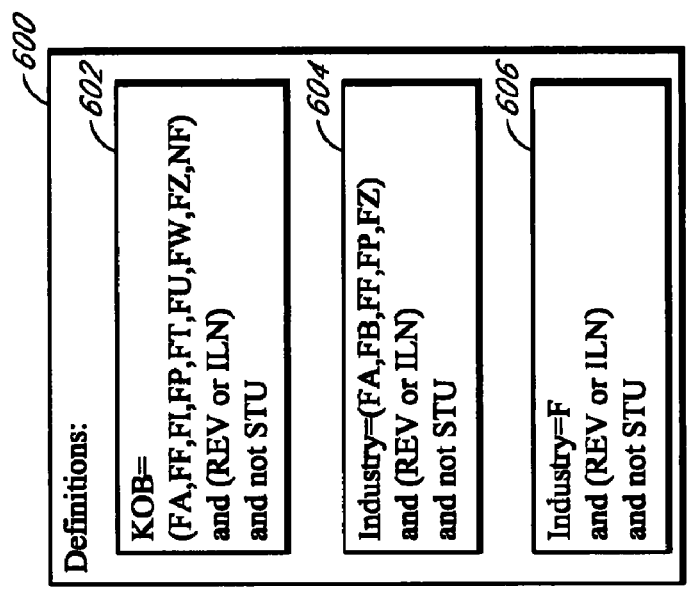
FIG. 6

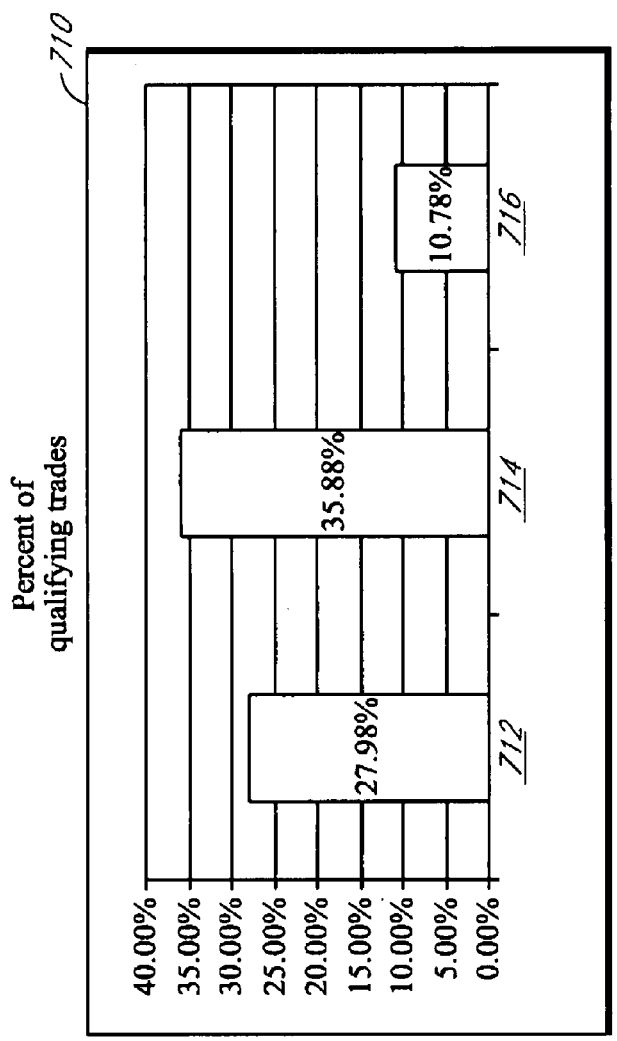
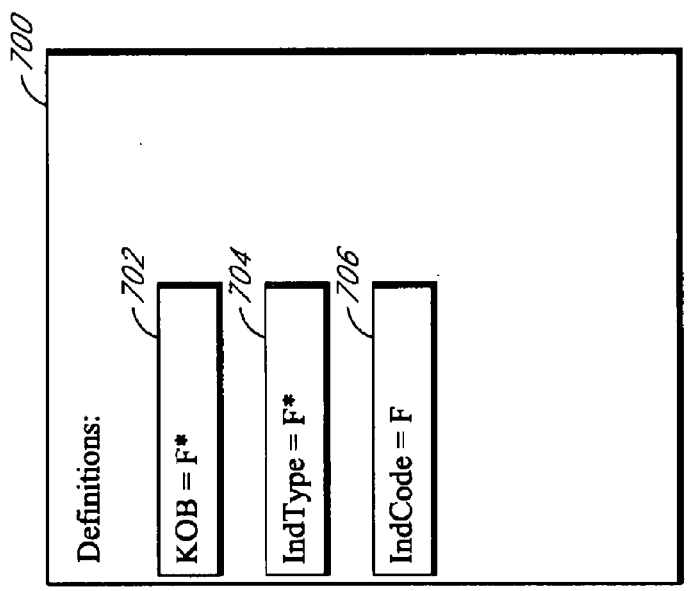
FIG. 7

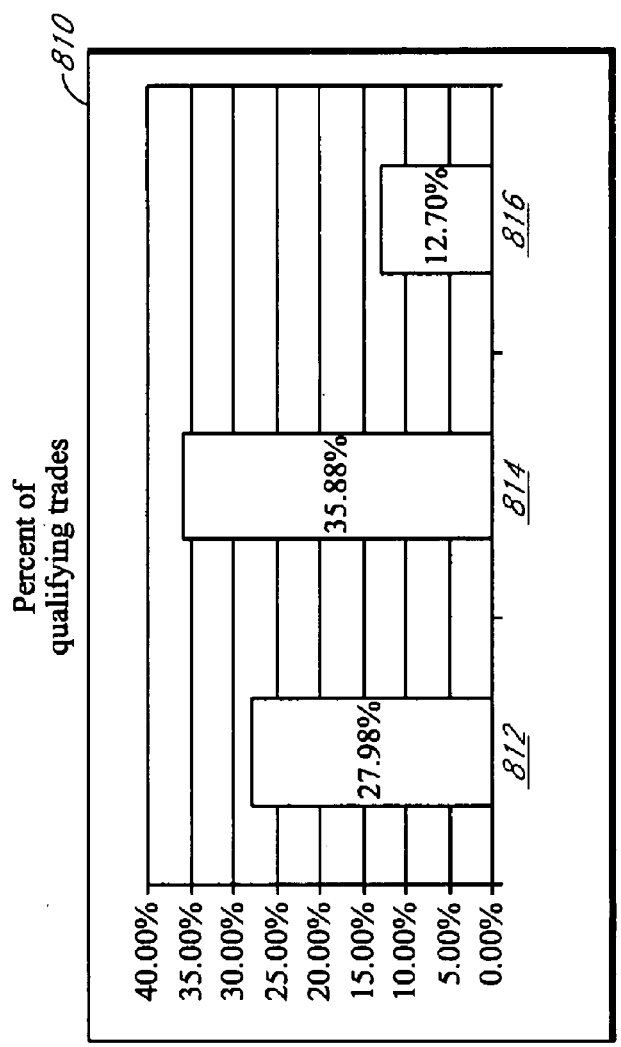
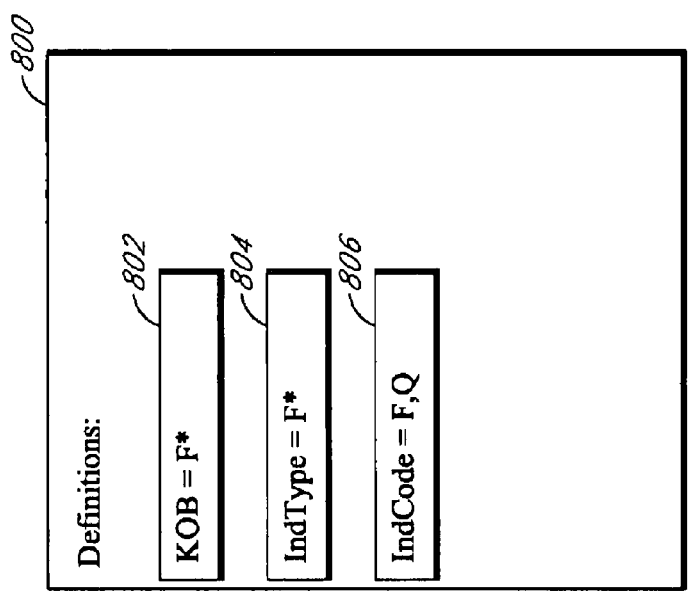
FIG. 8

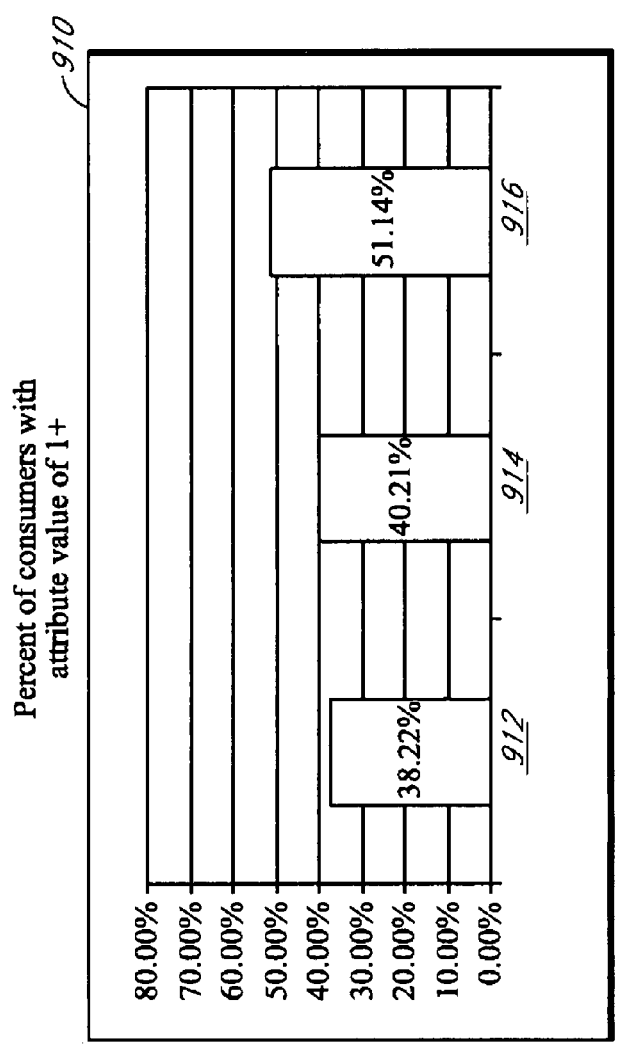
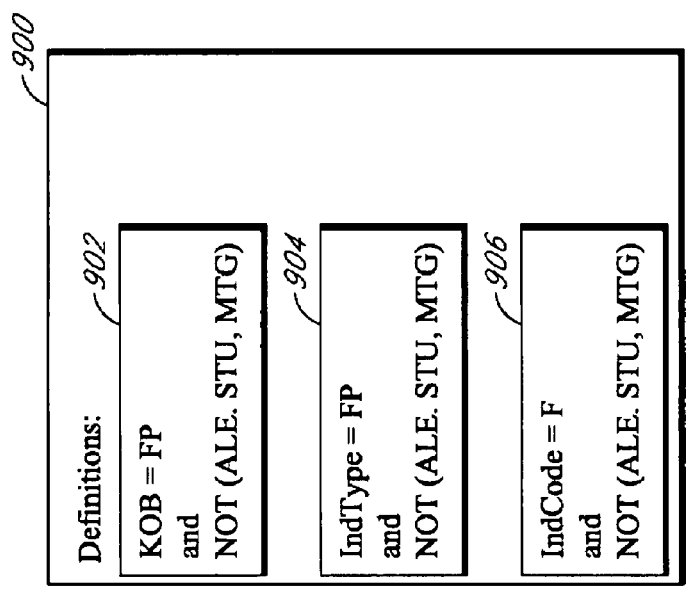
FIG. 9

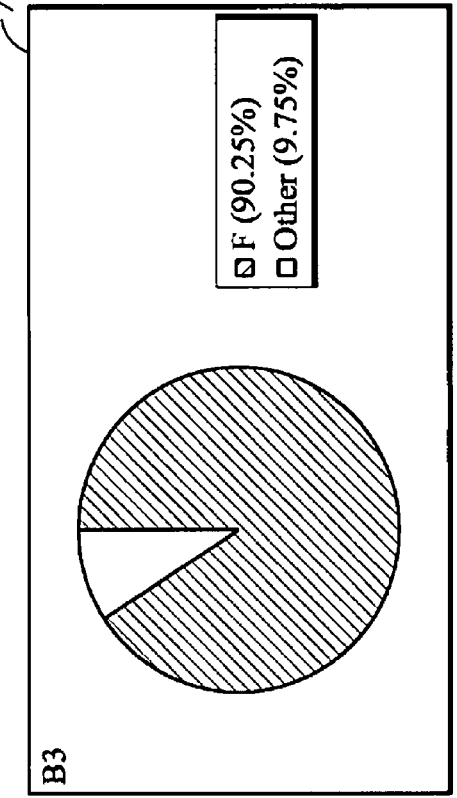
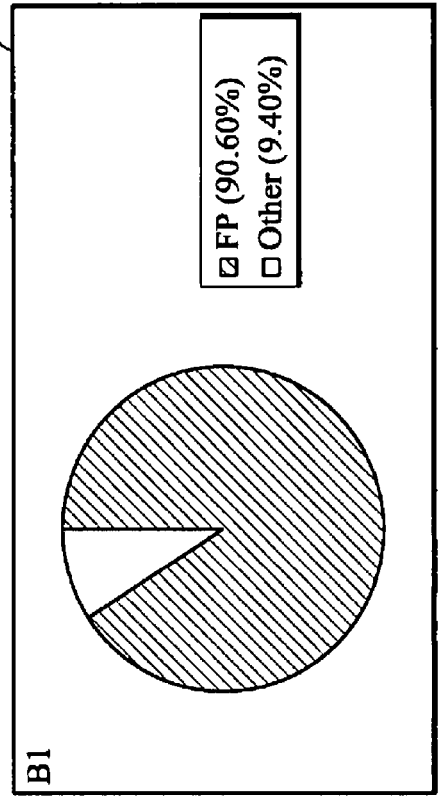
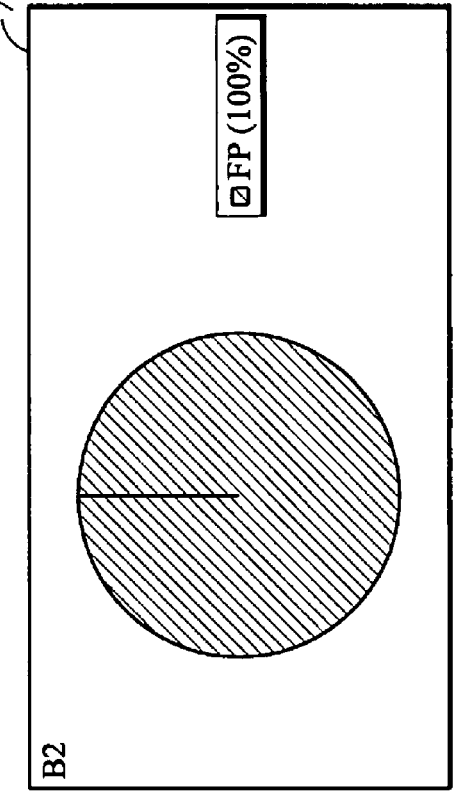
Examine FP trades at B2
FIG. 10B

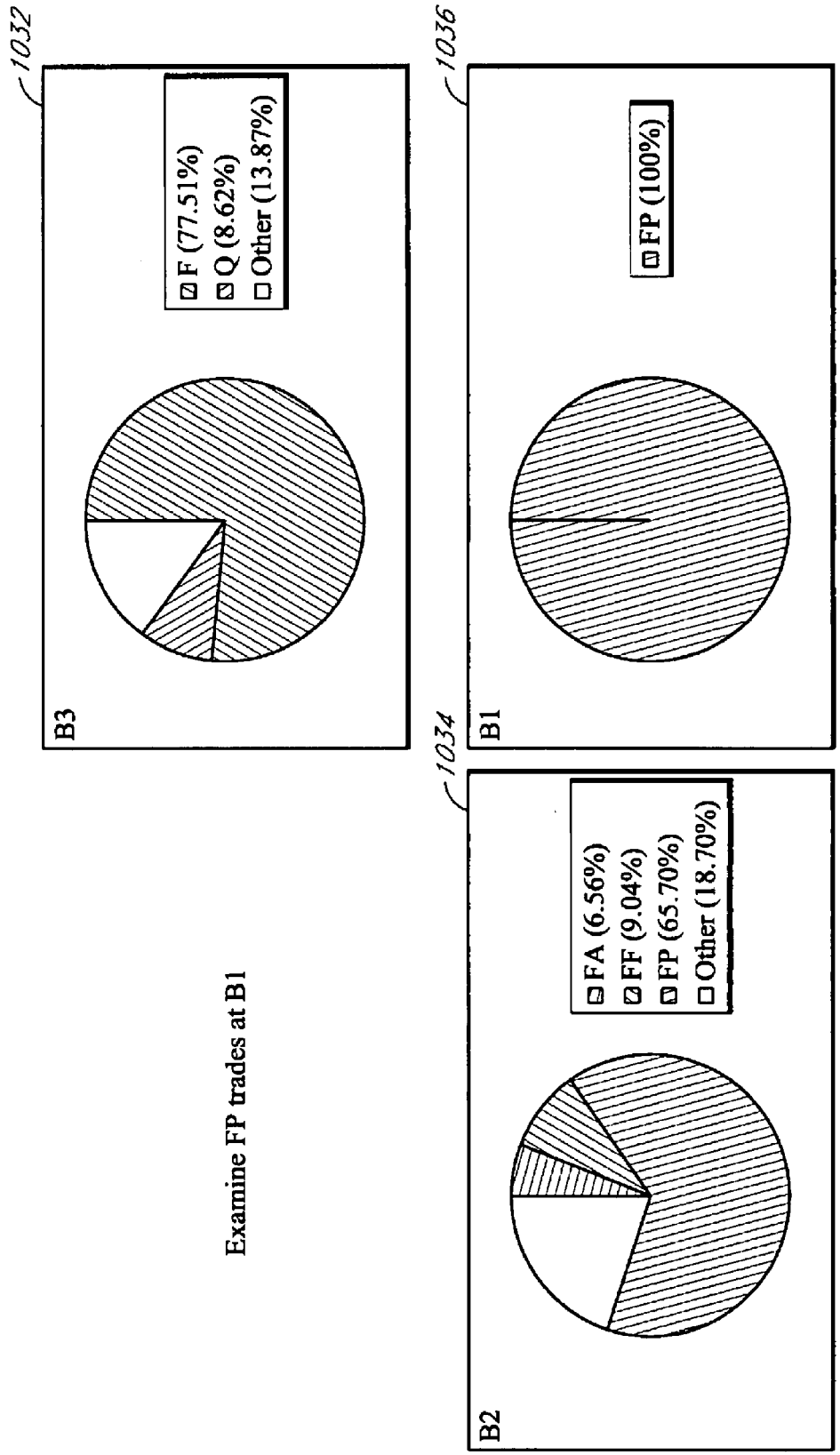

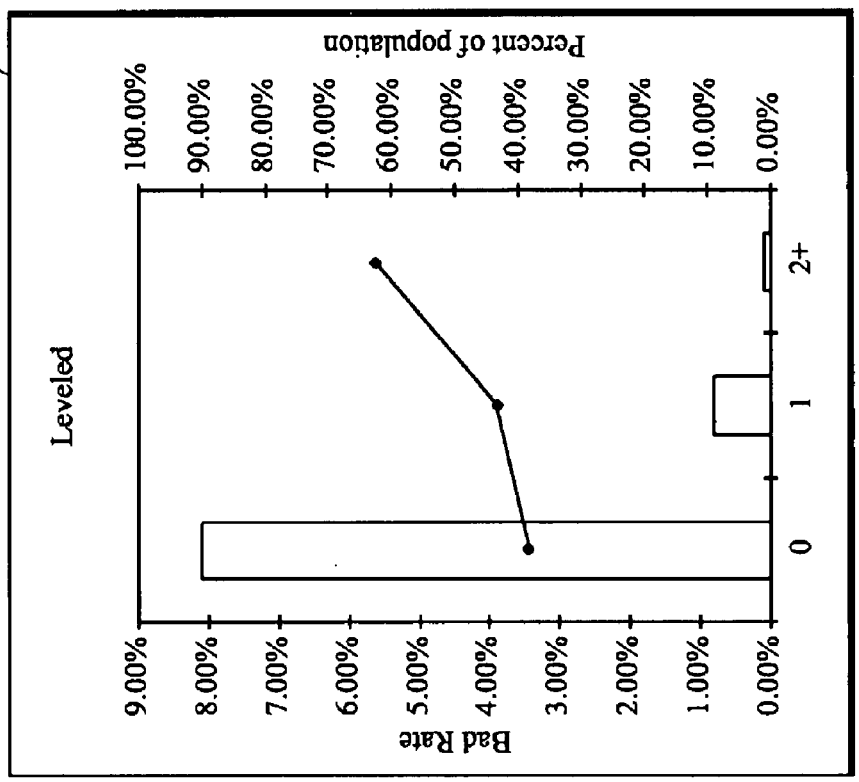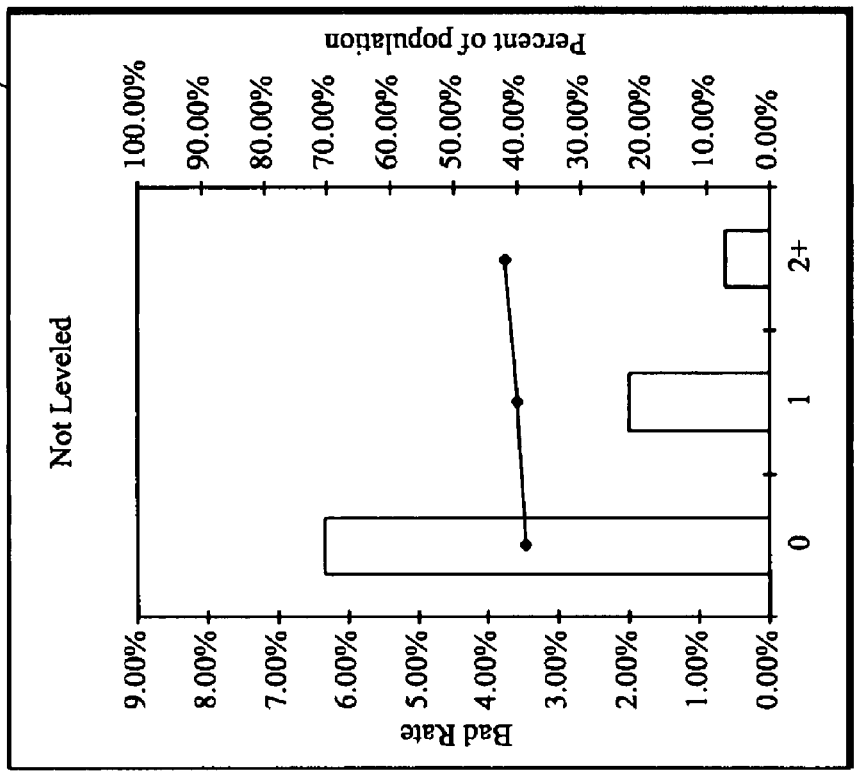
FIG. 12A

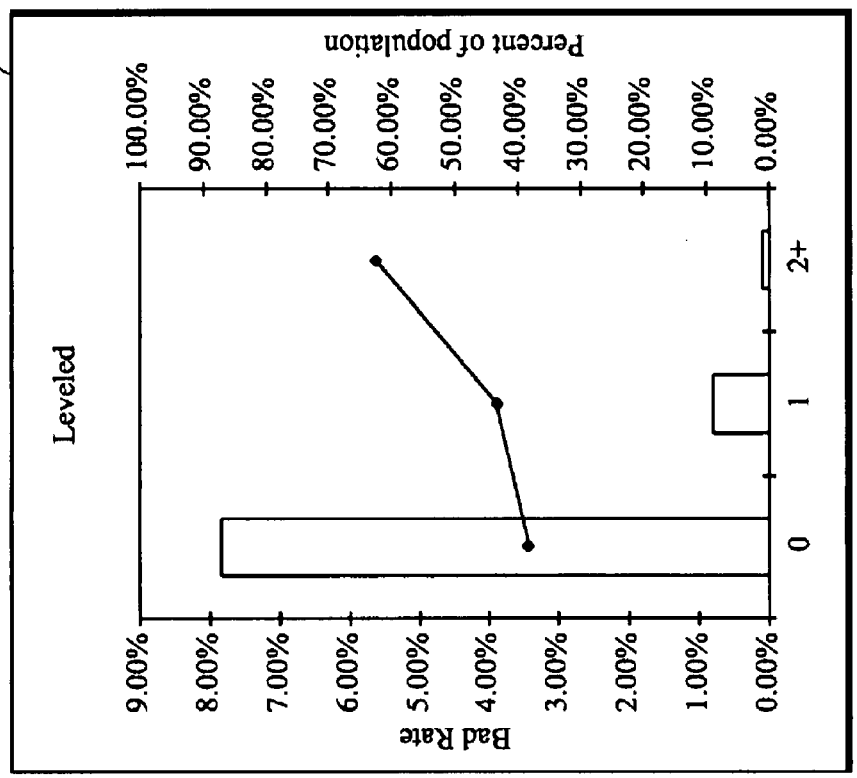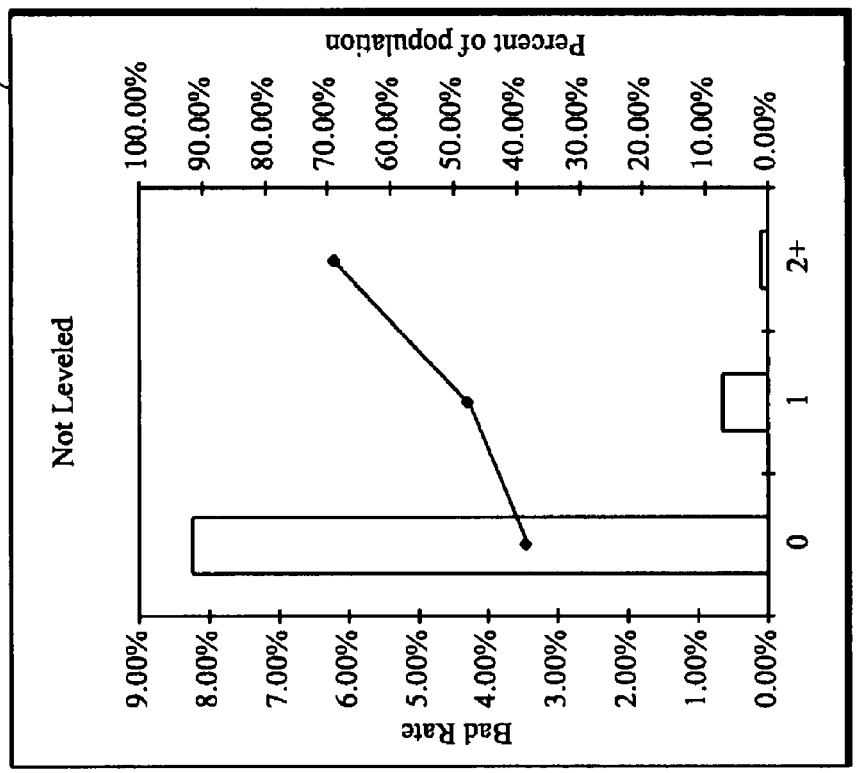
FIG. 12B

SYSTEM AND METHOD FOR GENERATING A FINANCE ATTRIBUTE FROM TRADELINE DATA

CROSS-REFERENCE TO RELATED APPLICATIONS

This application is based upon and claims the benefit of priority from U.S. Provisional Patent Application No. 60/849,542 filed on Oct. 5, 2006, the entire contents of which are incorporated herein by reference in their entirety. All publications and patent applications mentioned in this specification are herein incorporated by reference in their entirety to the same extent as if each individual publication or patent application was specifically and individually indicated to be incorporated by reference.

TECHNICAL FIELD

This disclosure generally relates to financial data processing, and more particularly to improved methods and systems for creating a financial attribute from data stored in credit databases.

DESCRIPTION OF RELATED ART

Various financial service providers provide credit accounts such as mortgages, automobile loans, credit card accounts, and the like, to consumers and businesses. In determining whether to extend credit to an applicant and under what terms, the financial service providers may rely upon financial data related to the credit activities, current assets, and current liabilities of the applicant. This information may be provided in the form of a credit score or with a credit report. A credit report may present the financial history of the credit applicant.

SUMMARY OF DISCLOSURE

In some embodiments, a system is described to provide additional relevant information to a financial service provider or other entity to allow that provider to make more informed decisions. One statistical risk tool used by financial service providers to predict payment behavior is a scorecard, and many scorecards rely on attributes generated from financial tradeline data from multiple credit data sources, for example, multiple credit bureaus. The attributes and/or scorecards provide more accessible and aggregated representations of the tradeline data and enable financial service providers to quickly determine the credit-worthiness of a credit applicant.

In certain cases, each credit bureau or other entity stores and reports financial tradeline data in a different format. Accordingly, attribute aggregation instructions can be developed for each bureau. The different data formats create significant challenges to the creation of attributes across the multiple bureaus.

According to one embodiment, the system generates a finance attribute from tradeline data obtained from multiple credit data sources. In one embodiment, the generated attribute can be used as a stand alone attribute to evaluate the financial behavior the credit applicant. In another embodiment, the attribute is used as part of a larger scorecard analysis to determine the payment default risk of a credit applicant.

Accordingly, embodiments of a system and method are described for generating a finance attribute from raw financial tradeline data reported by multiple credit data sources. In one embodiment, a computer implemented method for generating a finance attribute from raw tradeline data from a plurality of credit bureaus is provided. The method may comprise retrieving raw tradeline data from each of the plurality of credit bureaus; retrieving industry code data related to each of the plurality of credit bureaus; determining one or more tradeline leveling characteristics that meet at least one predetermined threshold; and generating a finance attribute using the selected leveling characteristics.

In another embodiment, determining one or more tradeline leveling characteristics that meet at least one pre-determined thresholds comprises designating a plurality of lowest common denominators from the industry code data related to each of the plurality of credit bureaus as the selected leveling characteristics; leveling the raw tradeline data from each of the plurality of credit bureaus to generate leveled tradeline data using the selected leveling characteristics; excluding extraneous tradeline data from the leveled tradeline data; measuring a correlation among the leveled tradeline data and the raw tradeline data; determining whether the correlation meets the at least one pre-defined threshold; adjusting the selected leveling characteristics if the correlation fails to meet the at least one pre-defined threshold comprising at least one of narrowing the selected leveling characteristics for at least one of the credit bureaus to a different subset of industry code data or including additional industry code data for at least one of the credit bureaus not included in the lowest common denominators in the selected leveling characteristics; and repeating said leveling, excluding, measuring, determining, and adjusting until the selected leveling characteristics generate a correlation that meets the at least one pre-defined threshold.

In another embodiment, determining one or more tradeline leveling characteristics that meet one or more pre-determined thresholds comprises designating a plurality of lowest common denominators from the industry code data related to each of the plurality of credit bureaus as the selected leveling characteristics; leveling the raw tradeline data from each of the plurality of credit bureaus to generate leveled tradeline data using the selected leveling characteristics; measuring a correlation among the leveled tradeline data and the raw tradeline data; determining whether the correlation meets the at least one pre-defined threshold; adjusting the selected leveling characteristics if the correlation fails to meet the at least one pre-defined threshold comprising at least one of narrowing the selected leveling characteristics for at least one of the credit bureaus to a different subset of industry code data or including additional industry code data for at least one of the credit bureaus not included in the lowest common denominators in the selected leveling characteristics; and repeating said leveling, measuring, determining, and adjusting until the selected leveling characteristics generate a correlation that meets the at least one pre-defined threshold.

In another embodiment, a computing system is provided. The computing system may comprise a communications module configured to receive raw tradeline data related to a plurality of credit bureaus and to receive industry code data related to each of the plurality of credit bureaus; a finance attribute generation module configured to receive raw tradeline data from each of the plurality of credit bureaus via the communications module, receive industry code data related to each of the plurality of credit bureaus; determine one or more tradeline leveling characteristics that meet at least one pre-determined threshold, and generate a finance attribute using the selected leveling characteristics; and a processor module configured to execute the finance attribute generation module.

In a further embodiment, the finance attribute generation module of the computing system is further configured to determine one or more tradeline leveling characteristics that meet at least one pre-determined thresholds by designating a plurality of lowest common denominators from the industry code data related to each of the plurality of credit bureaus as the selected leveling characteristics; leveling the raw tradeline data from each of the plurality of credit bureaus to generate leveled tradeline data using the selected leveling characteristics; excluding extraneous tradeline data from the leveled tradeline data; measuring a correlation among the leveled tradeline data and the raw tradeline data; determining whether the correlation meets the at least one pre-defined threshold; adjusting the selected leveling characteristics if the correlation fails to meet the at least one pre-defined threshold comprising at least one of narrowing the selected leveling characteristics for at least one of the credit bureaus to a different subset of industry code data or including additional industry code data for at least one of the credit bureaus not included in the lowest common denominators in the selected leveling characteristics; and repeating said leveling, excluding, measuring, determining, and adjusting until the selected leveling characteristics generate a correlation that meets the at least one pre-defined threshold.

In a further embodiment, the finance attribute generation module of the computing system is further configured to determine one or more tradeline leveling characteristics that meet at least one pre-determined thresholds by designating a plurality of lowest common denominators from the industry code data related to each of the plurality of credit bureaus as the selected leveling characteristics; leveling the raw tradeline data from each of the plurality of credit bureaus to generate leveled tradeline data using the selected leveling characteristics; measuring a correlation among the leveled tradeline data and the raw tradeline data; determining whether the correlation meets the at least one pre-defined threshold; adjusting the selected leveling characteristics if the correlation fails to meet the at least one pre-defined threshold comprising at least one of narrowing the selected leveling characteristics for at least one of the credit bureaus to a different subset of industry code data or including additional industry code data for at least one of the credit bureaus not included in the lowest common denominators in the selected leveling characteristics; and repeating said leveling, measuring, determining, and adjusting until the selected leveling characteristics generate a correlation that meets the at least one pre-defined threshold.

For purposes of summarizing the invention, certain aspects, advantages and novel features of the invention have been described herein. Of course, it is to be understood that not necessarily all such aspects, advantages or features will be embodied in any particular embodiment of the invention.

BRIEF DESCRIPTION OF THE DRAWINGS

FIG. 2 shows example tradeline data as reported by different bureaus according to one embodiment;

FIG. 3 shows example data structures used by different credit data sources according to one embodiment;

FIG. 6 shows a set of characteristics for leveling and the accompanying results on a sample data set according to one embodiment;

FIG. 7 shows another set of characteristics for leveling and the accompanying results on a sample data set according to one embodiment;

FIG. 8 shows yet another set of characteristics for leveling and the accompanying results on a sample data set according to one embodiment;

FIG. 9 shows a set of characteristics for leveling and the accompanying results on a sample data set according to one embodiment;

FIGS. 10A-10E show the results of applying various characteristics for leveling on a sample data set according to one embodiment;

FIGS. 12A-C provide comparison between the results of using two different sets of characteristics for leveling for three credit data sources according to one embodiment.

DETAILED DESCRIPTION OF PREFERRED EMBODIMENTS

Embodiments of the invention will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

Figure 1:
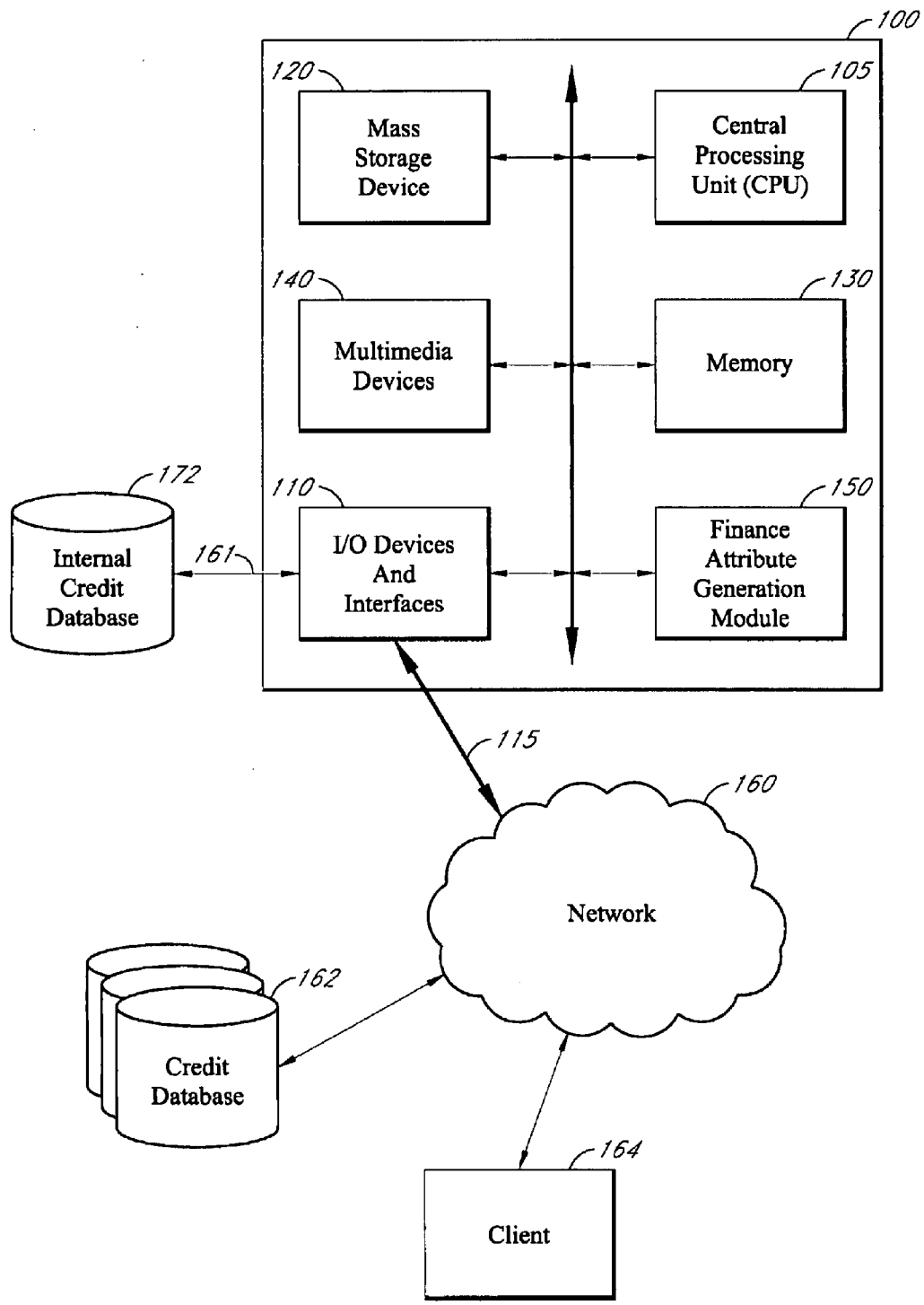
FIG. 1 is a block diagram of a system for generating a finance attribute according to one embodiment.

FIG. 1 is one embodiment of a block diagram of a computing system 100 that is in communication with a network 160 and various systems that are also in communication with the network 160. The computing system 100 may be used to implement certain systems and methods described herein. For example, the computing system 100 may be configured to receive financial and demographic information regarding individuals and generate reports and/or alerts for one or more clients. Although the description provided herein refers to individuals, consumers, or customers, the terms "individual," "consumer," and "customer" should be interpreted to include applicants, or groups of individuals or customers or applicants, such as, for example, married couples or domestic partners, organizations, groups, and business entities.

The computing system 100 includes, for example, a personal computer that is IBM, Macintosh, or Linux/Unix compatible. In one embodiment, the computing system 100 comprises a server, a laptop computer, a cell phone, a personal digital assistant, a kiosk, or an audio player, for example. In one embodiment, the exemplary computing system 100 includes a central processing unit ("CPU") 105, which may include a conventional microprocessor. The computing system 100 further includes a memory 130, such as random access memory ("RAM") for temporary storage of information and a read only memory ("ROM") for permanent storage of information, and a mass storage device 120, such as a hard drive, diskette, or optical media storage device. Typically, the modules of the computing system 100 are connected to the computer using a standards based bus system. In different embodiments, the standards based bus system could be Peripheral Component Interconnect ("PCI"), Microchannel, Small Computer System Interface ("SCSI"), Industrial Standard Architecture ("ISA") and Extended ISA ("EISA") architectures, for example. In addition, the functionality provided for in the components and modules of computing system 100 may be combined into fewer components and modules or further separated into additional components and modules.

The computing system 100 is generally controlled and coordinated by operating system software, such as Windows 95, Windows 98, Windows NT, Windows 2000, Windows XP, Windows Vista, Linux, SunOS, Solaris, or other compatible operating systems. In Macintosh systems, the operating system may be any available operating system, such as MAC OS X. In other embodiments, the computing system 100 may be controlled by a proprietary operating system. Conventional operating systems control and schedule computer processes for execution, perform memory management, provide file system, networking, I/O services, and provide a user interface, such as a graphical user interface ("GUI"), among other things.

The exemplary computing system 100 includes one or more commonly available input/output (I/O) devices and interfaces 110, such as a keyboard, mouse, touchpad, and printer. In one embodiment, the I/O devices and interfaces 110 include one or more display device, such as a monitor, that allows the visual presentation of data to a user. More particularly, a display device provides for the presentation of GUIs, application software data, and multimedia presentations, for example. The computing system 100 may also include one or more multimedia devices 140, such as speakers, video cards, graphics accelerators, and microphones, for example.

In the embodiment of FIG. 1, the I/O devices and interfaces 110 provide a communication interface to various external devices. In the embodiment of FIG. 1, the computing system 100 is electronically coupled to a network 160, which comprises one or more of a LAN, WAN, or the Internet, for example, via a wired, wireless, or combination of wired and wireless, communication link 115. The network 160 communicates with various computing devices and/or other electronic devices via wired or wireless communication links.

According to FIG. 1, information is provided to computing system 100 over the network 160 from one or more data sources including, for example, credit databases 162. The information supplied by the various data sources may include credit data, demographic data, application information, product terms, accounts receivable data, and financial statements, for example. In addition to the devices that are illustrated in FIG. 1, the network 160 may communicate with other data sources or other computing devices. In addition, the data sources may include one or more internal and/or external data sources. In some embodiments, one or more of the databases or data sources may be implemented using a relational database, such as Sybase, Oracle, CodeBase and Microsoft® SQL Server as well as other types of databases such as, for example, a flat file database, an entity-relationship database, and object-oriented database, and/or a record-based database.

In addition to supplying data, client 164 may further request information from the computing system 100. For example, the client 164 may request data related to a consumer or a group of consumers. Such a request may include consumer information identifying the consumer(s) for which information is desired.

The I/O devices and interfaces 110 further provide a communication interface to an internal credit database 172. In the embodiment of FIG. 1, the computing system 100 is coupled to a secured network 161, such as a secured LAN, for example. The secured network 161 communicates with the internal credit database 172. In some embodiments, the internal credit database 172 is configured to communicate with additional computing devices over the network 160 or some other network, such as a LAN, WAN, or the Internet via a wired, wireless, or combination of wired and wireless, communication link. In certain embodiments, the client 164 may have access to the internal credit database 172 through the network 160, and/or the secured network 161.

In the embodiment of FIG. 1, the computing system 100 also includes a finance attribute generation module 150 that may be executed by the CPU 105. This module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In the embodiment shown in FIG. 1, the computing system 100 is configured to execute the finance attribute generation module 150, among others, in order to generate and/or calculate the value for a finance attribute. Finance attribute generation module 150 is further configured to access internal credit database 172, credit databases 162, along with additional sources of information. In some embodiments, finance attribute generation module 150 may be configured to obtain tradeline data from internal credit database 172, from credit databases 162 or from a combination of internal credit database 172 and credit databases 162. These records are accessed by the finance attribute generation module 150 to generate a finance attribute aggregated from raw tradeline data returned by the various credit databases, as will be described in more detail below.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

FIG. 2 shows examples of finance tradeline data as reported by three different credit data sources. In the example, the credit data sources are credit bureaus, though in other embodiments, the credit data sources are other sources in addition or instead of one or more of the credit bureaus. Tradeline data 200, 202, and 204 are from various credit data sources, for example, from credit bureau 1, credit bureau 2, and credit bureau 3, respectively. These could be, for example, Experian, Equifax, and TransUnion. Although all three examples refer to the same tradeline of the individual consumer profiled, a "NORTHEAST CREDIT UNION"

account, each bureau reports that tradeline data differently. The differences arise from the mechanism(s) by which credit data are collected and stored. For example, in the United States, even though creditors report data to the credit data sources in standard Metro formats, each data source interprets the information differently and has its own unique format for returning the data.

In some embodiments, the tradeline data may comprise different or additional data fields than as shown. A skilled artisan will understand that the processes described herein may be modified to accommodate different forms of financial data.

FIG. 3 shows a particular example of how the data and/or data structures may vary across the credit data sources. In this example, although both credit data sources 300 and 302 use two-letter codes to denote the tradeline category, they differ in their internal coding. For example, credit data source 300 has additional codes to denote tradeline related to education loans (those beginning with "E"). On the other hand, some credit data sources such as credit data source 304 may use a one-letter code to denote the tradeline category (for example using "F" to denote all tradelines related to personal finance).

Aside from the differences in data and/or data structures, there are also variations in data representation. As a result, the same loan by the same consumer may be represented differently across different credit data sources. For example, credit data source 300 may classify an auto loan tradeline with the code "FA" (for Auto financing co.) while credit data source 302 may classify the same loan as "FP" (for Personal loan co.). Credit data source 304 may simply classify the same loan with an "F" code (generic Personal Finance). Thus, a creditor who relies on such data to determine whether to extend credit needs to account for these differences. In many instances, these differences make this a difficult endeavor for the average creditor. The finance attributes generated by embodiments of the disclosure take these differences into account and enable such a creditor to easily and quickly assess consumer behavior.

Figure 4:
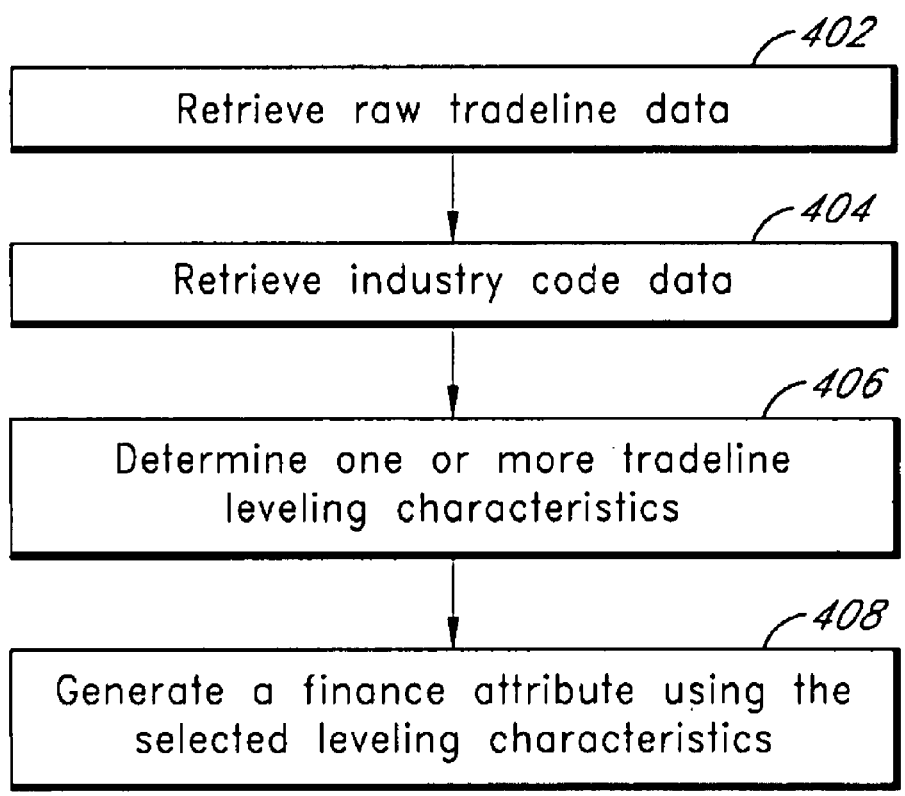
FIG. 4 is a flow chart showing the process of generating a finance attribute according to one embodiment.

FIG. 4 is a system flowchart showing the operation of embodiments of the disclosure that may be executed on computing system 100. The operation begins at state 402, where raw tradeline data is first retrieved and/or received. Industry code data from the various credit data sources, such as those illustrated in FIG. 3, is then retrieved and/or received in state 404. Next, at state 406 tradeline characteristics, such as those shown in FIG. 6, are determined. Then at state 408, a finance attribute is generated using the selected characteristics. It is recognized that other embodiments of FIG. 4 may also be used, such as, for example, embodiments where the raw tradeline data is retrieved and/or received after or at the same time as the industry code data, and embodiments where raw tradeline data is retrieved and/or received and industry code data is not retrieved and/or received. While this example focuses on filtering finance tradeline data, those skilled in the art will appreciate that the same leveling methods can be applied to various types of credit or financial data.

The process of leveling involves determining a proper set of characteristics that will yield leveled, for example, consistent tradeline data from the various credit data sources. As can be seen in FIG. 6 below, once the KOB or Industry code data are known, the goal becomes incorporating the proper codes into the set of characteristics. Embodiments of the present disclosure use an iterative process to select characteristics and measure the resulting data against certain thresholds, with each successive iteration producing more refined characteristics that produces more leveled data.

Figure 5:
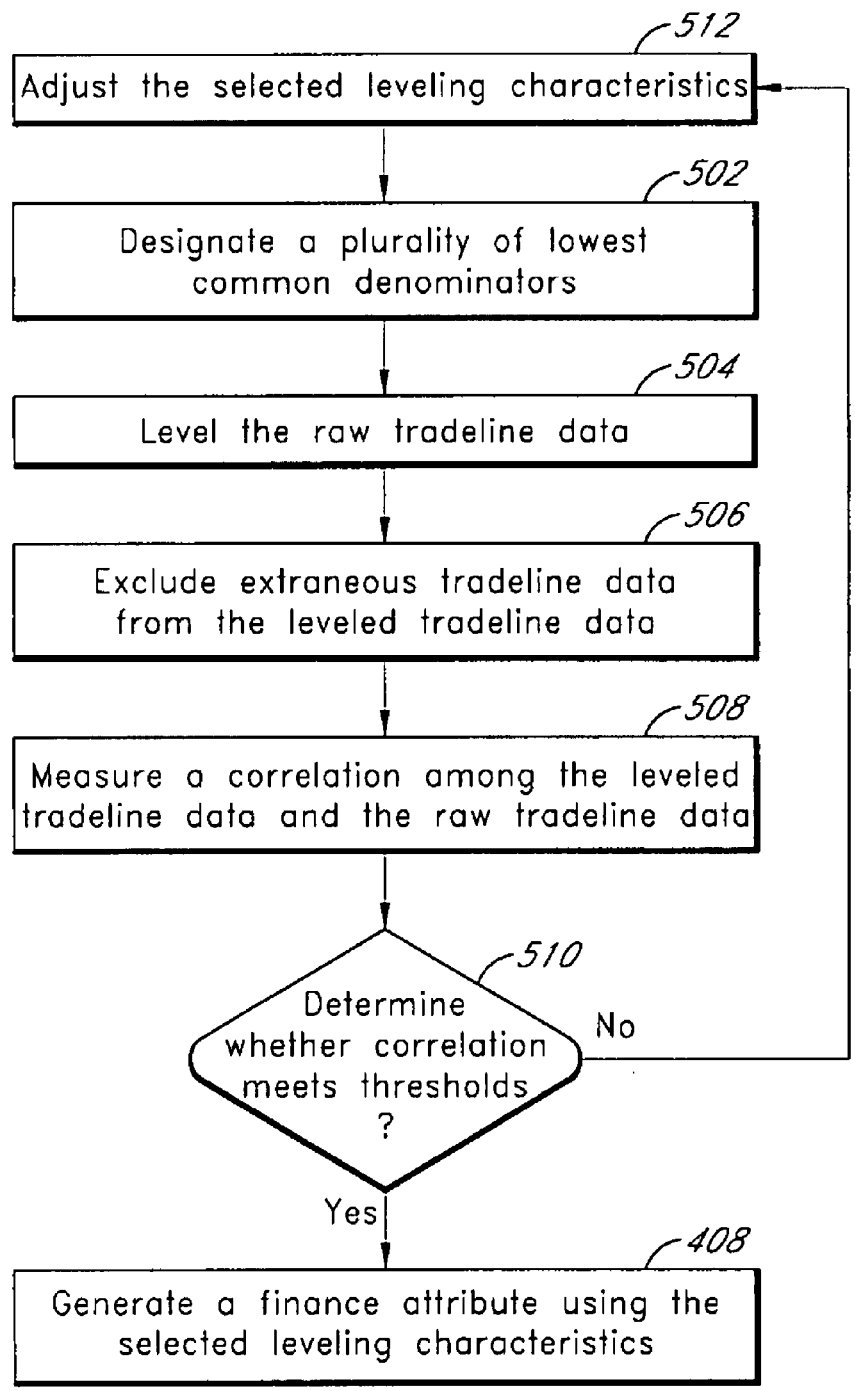
FIG. 5 is a flow chart showing a process for determining characteristics for leveling according to one embodiment.

FIG. 5 illustrates one embodiment of the process undertaken in state 406 of FIG. 4 according to one embodiment. The process begins in state 502, where a plurality of lowest common denominators is designated as the selected characteristics to be used in the leveling. In one embodiment, the lowest common denominators selected are the minimum set of overlapping tradeline category codes. Then in state 504, the raw tradeline data are leveled using the selected characteristics. Next, in state 506, extraneous tradeline data are excluded from the leveled tradeline data. In another embodiment, the process moves to state 508 without excluding the extraneous tradeline data. In state 508, the process measures a correlation among the leveled tradeline data and the raw tradeline data. At decision state 510, if the correlation measured in 508 meets one or more pre-defined thresholds, the process is complete, exits this process, and proceeds, for example, to state 408 of FIG. 4, where a finance attribute is generated. Otherwise, if the correlation does not meet the thresholds, the process proceeds to state 512, where the selected characteristics for leveling are adjusted and the process begins again.

In one embodiment, the thresholds differ based on the desired attribute and/or are pre-defined. For example, an embodiment of the invention may have a range of acceptable percentages as the thresholds. In that embodiment, if the differences among leveled tradeline data (such as the ones shown in graph 810 as discussed below) are within those ranges, then the thresholds are considered met. In other embodiments, such thresholds are defined so that the system will undertake a fewer number of iterations as to produce quicker results. Those skilled in the art can appreciate that the thresholds can be tailored to a variety of potentially competing objectives such as speed and accuracy, so that a number of trade-offs may be considered before such thresholds are input into the system.

FIG. 6 provides an example of different finance attributes from multiple credit data sources according to an embodiment of the invention. Characteristics 600 comprise various finance characteristics. Characteristics 602 are directed to tradeline data from credit data source 1. Because credit data source 1 uses a two-letter Kind of Business (KOB) code to categorize its tradeline data, characteristics 602 use a set of two-letter finance-related codes' to select finance tradeline data. Similarly, characteristics 604 are directed to tradeline data from credit data source 2. Much like characteristics 602, characteristics 604 also use a set of finance-related codes. Finally, characteristics 606 are directed to tradeline data from credit data source 3, which uses a one-letter Industry code. The term "REV" means revolving tradelines and the term "ILN" means installment tradelines. In this example, both types of tradelines are selected. The term "STU" means student tradelines and these tradelines are excluded in this example.

In FIG. 6, graph 610 shows the results of applying characteristics 600 to a sample data set from the three credit data sources. The attribute value "1+" means one or more tradelines. The graph 610 shows that 77.28% of consumers have at least one finance tradeline in credit data source 1, 81.02% of consumers have at least one finance tradeline in credit data source 2, and 58.01% of consumers have at least one finance tradeline in credit data source 3. While there is substantial overlap, the differences reflect the different data structures and representations used by the credit data sources. In this example, the differences among the results do not meet a predetermined preferred threshold. Therefore, in one embodiment, the characteristics are further refined to level the data.

FIG. 7 shows the use of revised characteristics along with the results. Characteristics 700 utilize the lowest common denominators across the credit data sources. This example embodiment of the invention recognizes that all three credit data sources use "F" in whole or in part in their categorization of finance tradeline data. Using this lowest common denominator approach, characteristics 702 select any tradeline data within credit data source 1 that has a KOB code that begins with "F," as shown by the pseudo-code "F*." Similarly, characteristics 704 select any tradeline data within credit data source 2 that has an Industry code that begins with "F," as shown by the pseudo-code "F*." Finally, characteristics 706 select any tradeline data with an Industry code "F" within credit data source 3.

Graph 710 shows the results of applying characteristics 700 to the same sample data set as in FIG. 6. The graph 710 shows that characteristics 700 results in a 27.98% match from credit data source 1, a 35.88% match from credit data source 2, and a 10.78% match from credit data source 3. In this example, the differences among the results do not meet a predetermined preferred threshold. Accordingly, another leveling attempt is applied.

FIG. 8 shows the use of revised characteristics along with the results. Here, characteristics 800 use a more refined set of characteristics than those shown in FIG. 7. This embodiment also recognizes that all three credit data sources use "F" in whole or in part in their categorization of finance tradeline data. Therefore, characteristics 802 and 804 select with "F*." In addition, characteristics 806 also select for code "Q" within credit data source 3 to capture those tradeline data categorized as "Q—other finance."

Graph 810 shows the results of applying characteristics 800 to the same sample data set as in FIGS. 6 and 7. Characteristics 800 results in a 27.98% match from credit data source 1, a 35.88% match from credit data source 2, and a 12.70% match from credit data source 3, an increase of about two percent over bar 716 from graph 710. In this example, the differences among the results do not meet a predetermined preferred threshold. Accordingly, another leveling attempt is applied. By way of this iterative process of refining the characteristics, embodiments of the present disclosure improve the quality of the resulting finance attributes. In other embodiments, the thresholds can be defined so that the results shown in FIG. 6, 7, or 8 would satisfy the thresholds, thereby enabling those embodiments to undertake fewer revisions to the characteristics and generate the finance attribute with greater speed.

FIG. 9 shows the use of revised characteristics as well as a cleanup to eliminate extraneous tradelines. Characteristics 900 use a more refined set of characteristics than those shown in FIG. 8. This embodiment also recognizes that focus on the "FP" codes Therefore, characteristics 902 select FP, characteristics 904 select FP, and characteristics 906 select F. In addition, a clean up is applied to the characteristics 900 to remove extraneous tradeline data. For example, in this embodiment characteristics 902, 904, and 906 remove ALE, STU, and MTG (auto lease trades, student trades, mortgage loan trades, etc.).

Graph 910 shows the results of applying characteristic set 900 to the same sample data set as in FIGS. 6, 7, and 8. The graph 910 shows that characteristics 900 result in a 38.22% match from credit data source 1, a 40.21% match from credit data source 2, and a 51.14% match from credit data source 3. In this example, the differences among the results do meet the pre-determined preferred threshold so the iterative process can end and the finance attribute can be generated.

One embodiment of a method of measuring correlation is further illustrated below in conjunction with FIGS. 10A-10E. FIGS. 10A-10E show the correlation among the results of applying different characteristics for leveling on a sample data set according to one embodiment of the present disclosure.

Figure 10A:
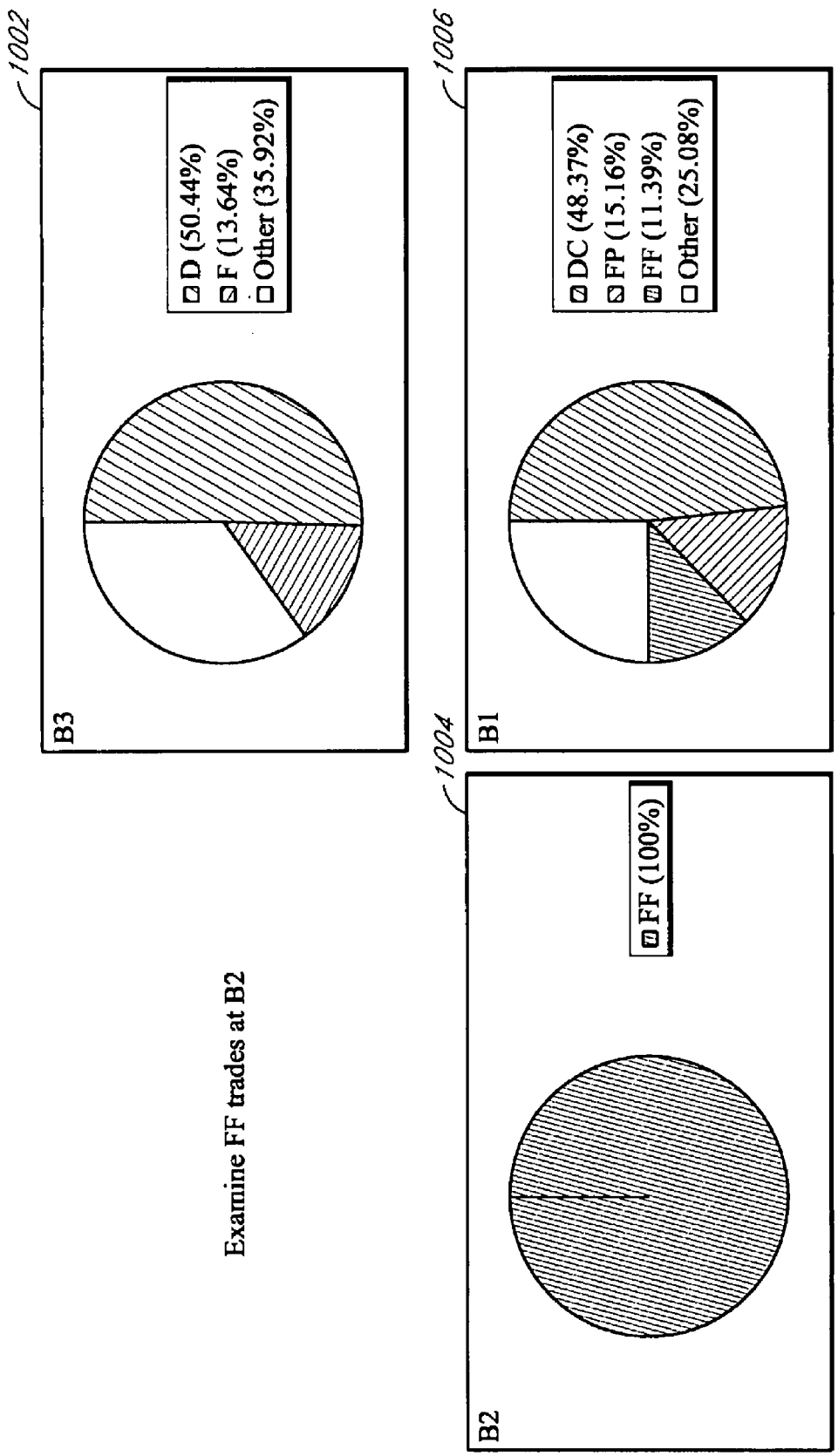

FIG. 10A shows the results of applying a set of characteristics that focuses on the KOB or Industry code "FF" (sales financing) at B2, or credit bureau 2. Graph 1004 shows a 100% match at B2 since the characteristics include the same Industry code used by B2. Graph 1002 shows the type of data returned by B3, or credit bureau 3, using the same characteristics. It indicates that 50.44% of the data returned are in the "D" category, 13.64% of the data returned are in the "F" category, and 35.92% of the data returned are in the "Other" category. The "D" category stands for department store accounts. Graph 1006 shows the type of data returned by B1, or credit bureau 1, using the same characteristics. It indicates that 48.37% of the data returned are in the "DC" category (also stands for department stores), 15.16% of the data returned are in the "FP" category, 11.39% of the data returned are in the "FF" category, and 25.08% of the data returned are in the "Other" category.

FIG. 10B shows the results of applying a set of characteristics that focuses on the KOB or Industry code "FP" (personal finance) at B2. Graph 1014 shows a 100% match at B2 since the characteristics include the same Industry code used by B2. Graph 1012 shows the type of data returned by B3 using the same characteristics. It indicates that 90.25% of the data returned are in the "F" (personal finance) category and 9.75% of the data returned are in the "Other" category. There is a high degree of correlation between the results from B2 and B3. A similar high correlation is found between the results from B1 and B2. Graph 1016 indicates that 90.60% of the data returned are in the "FP" category, with 9.40% of the data returned are in the "Other" category.

Figure 10C:
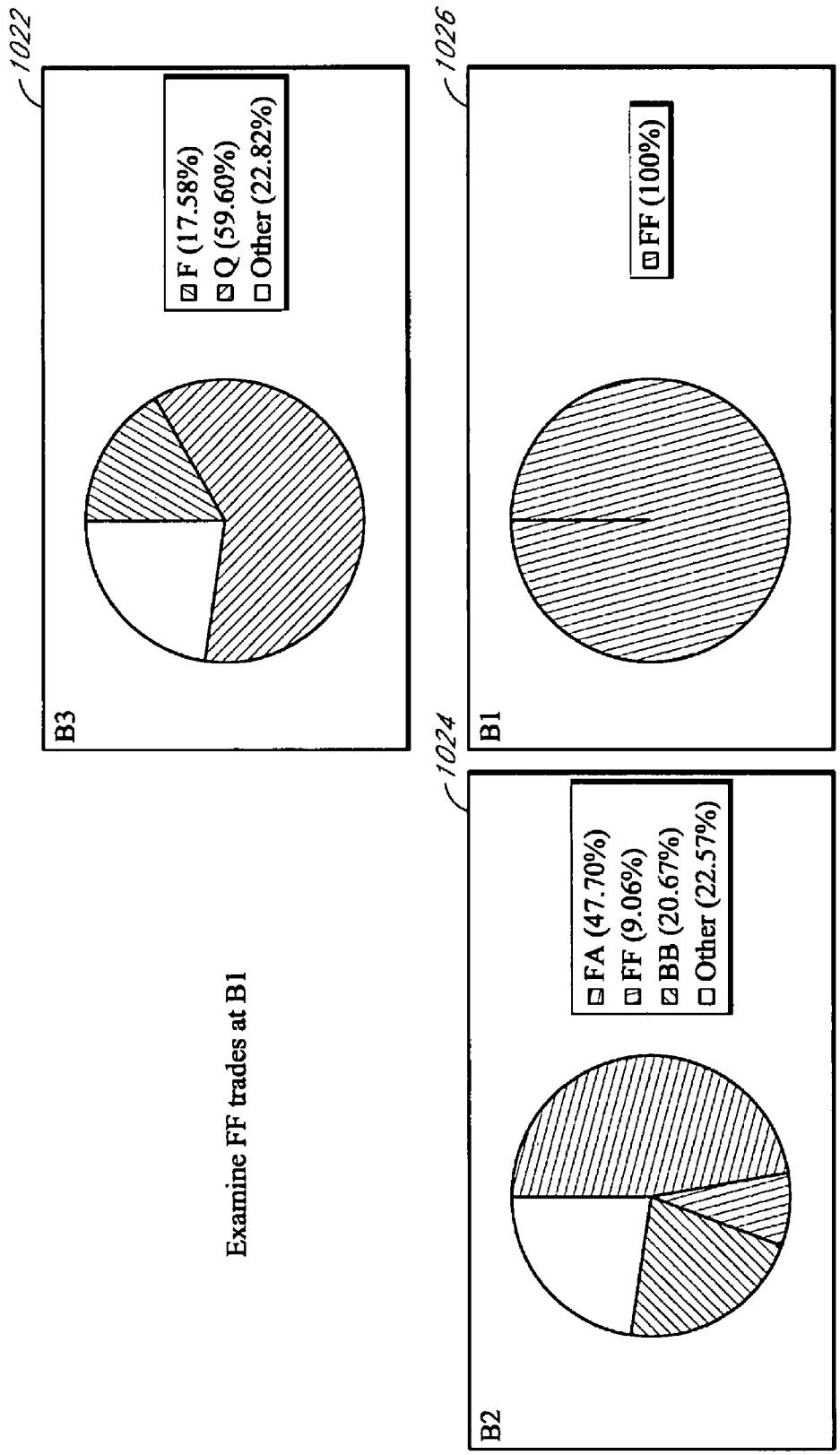

FIG. 10C shows the results of applying a set of characteristics that focuses on the KOB or Industry code "FF" at B1. Graph 1026 shows a 100% match at B1 since the characteristics include the same Industry code used by B1. Graph 1022 shows the type of data returned by B3 using the same characteristics. It indicates that 17.58% of the data returned are in the "F" category, 59.60% of the data returned are in the "Q" category, and 22.82% of the data returned are in the "Other" category. Graph 1024 shows the type of data returned by B2. It indicates that 47.70% of the data returned are in the "FA" (auto financing) category, 9.06% of the data returned are in the "FF" category, 20.67% of the data returned are in the "BB" (banks) category, and 22.57% of the data returned are in the "Other" category.

FIG. 10D shows the results of applying a set of characteristics that focuses on the KOB or Industry code "FP" at B1. Graph 1036 shows a 100% match at B1 since the characteristics include the same Industry code used by B1. Graph 1032 shows the type of data returned by B3 and indicates that 77.51% of the data returned are in the "F" category, 8.62% of the data returned are in the "Q" category, and 13.87% of the data returned are in the "Other" category. The amounts to a high correlation between the data from B3 and B1 because "F" and "Q" data from B3 are both finance tradelines and they combine to make up over 86% of the result. Similarly, there is a high correlation between the data from B1 and B2. Graph 1034 shows the type of data returned by B2. It indicates that 6.56% of the data returned are in the "FA" category, 9.04% of the data returned are in the "FF" category, 65.70% of the data returned are in the "FP" category, and 18.70% of the data returned are in the "Other" category. The categories that begin with "F" from B2 total again over 80%, which means that 80% of the data returned by B2 using the same characteristics are finance tradelines as well.

Figure 10E:
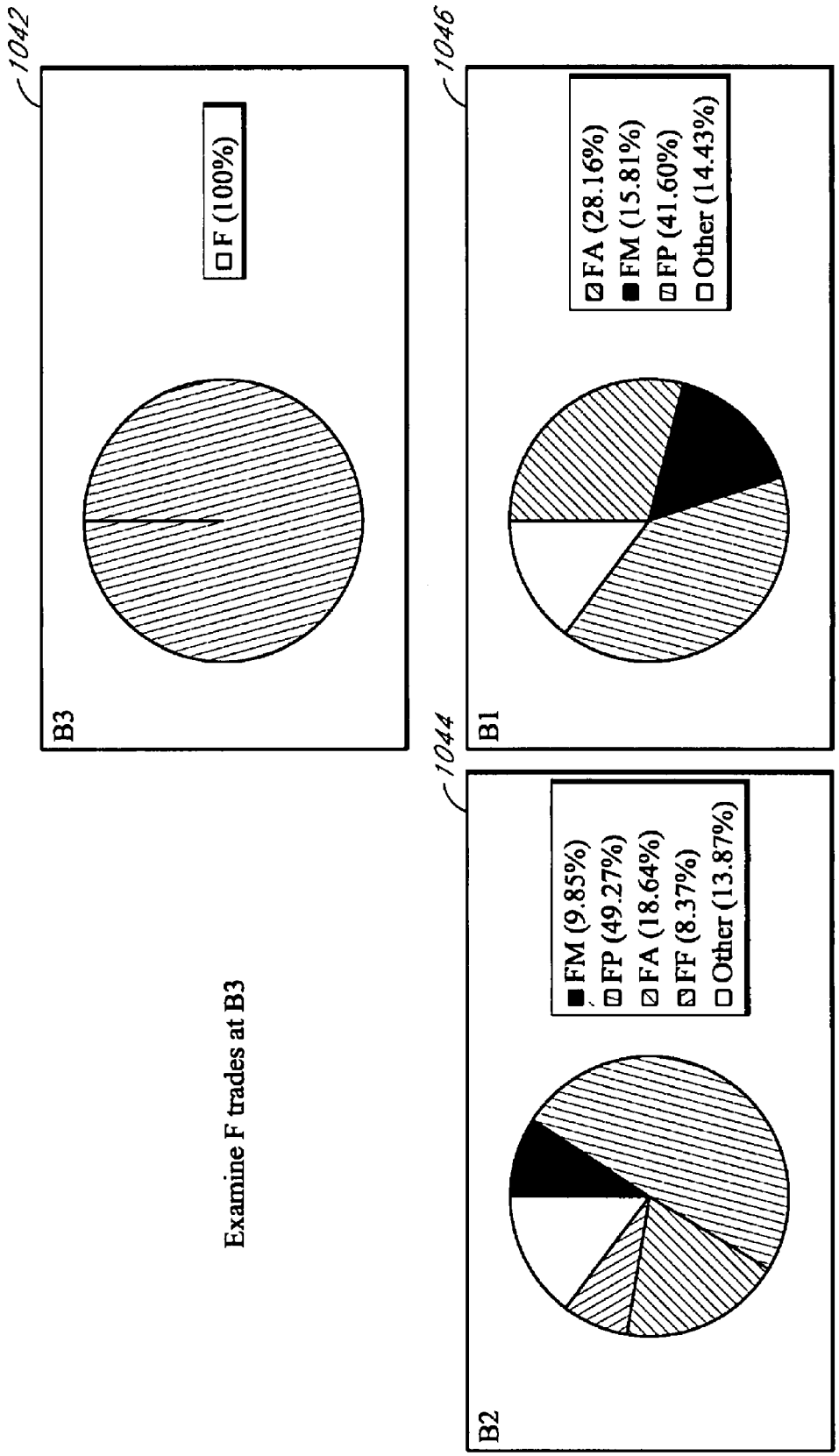

Finally, FIG. 10E shows the results of applying a set of characteristics that focuses on the Industry code "F" at B3, or credit bureau 3. Graph 1042 shows a 100% match at B3 since the characteristics include the same Industry code used by B3. Graph 1044 shows the type of data returned by B2. It indicates that 9.85% of the data returned are in the "FM" category, 49.27% of the data returned are in the "FP" category, 18.64% of the data returned are in the "FA" category, 8.37% of the data returned are in the "FF" category, and 13.87% of the data returned are in the "Other" category. Graph 1046 shows the type of data returned by B1. It indicates that 28.16% of the data returned are in the "FA" category, 15.81% of the data returned are in the "FM" category, 41.60% of the data returned are in the "FP" category, and 14.43% of the data returned are in the "Other" category. Because of the high degree of correlation among the results in FIG. 10B, in one embodiment those characteristics shown in FIG. 10B are used to level tradeline data. Other embodiments use the characteristics shown in FIG. 10A, 10C-10E. Another embodiment evaluates the results of applying these characteristics in an iterative process and selects the ones with the best correlation as part of state 406 in FIG. 4.

Figure 11:
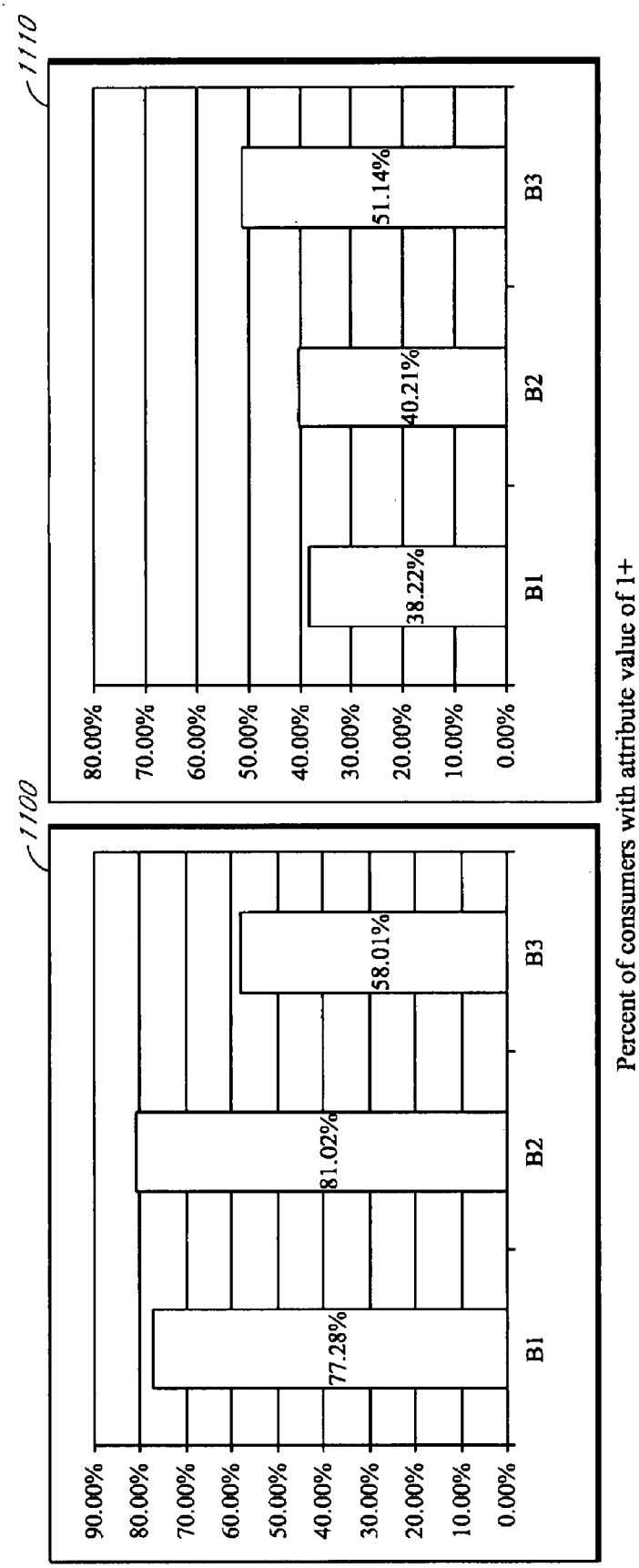
FIG. 11 provides a comparison between the results of using two different sets of characteristics for leveling according to one embodiment.

FIG. 11 illustrates embodiments of a side-by-side comparison of the results shown in FIGS. 6 and 9. Graph 1100 shows the resulting tradeline data from applying the characteristics shown in FIG. 6, while graph 1110 shows the resulting tradeline data from applying the characteristics shown in FIG. 9. As can be seen, the results from applying the characteristics in FIG. 9 have a higher correlation and are more leveled. One embodiment of the invention may begin by selecting characteristics that produce results similar to those shown in FIG. 6, and through the iterative process described above in conjunction with FIGS. 6-9, and/or 10A-E, arrive at characteristics that produce results similar to those shown in FIG. 9.

Figure 12C:
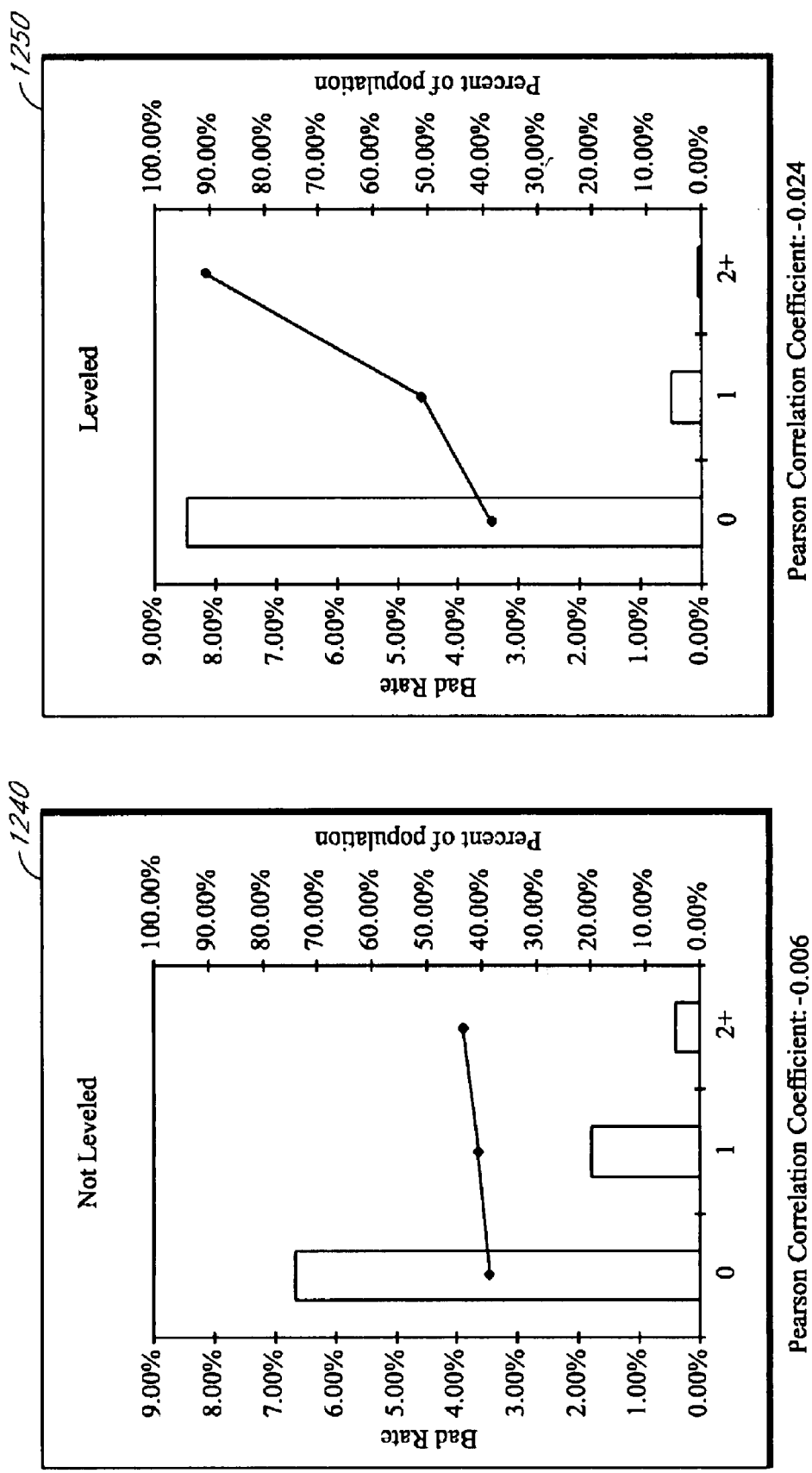

FIGS. 12A-12C illustrate embodiments of graphs that show the use of unleveled attributes and leveled attributes as predictors of payment defaults for each of the credit bureaus. In FIG. 12A, Graph 1200 shows an example finance attribute generated by an embodiment of the present disclosure. The left Y-axis shows the bad-rate, for example, the rate of defaults, as indicated by the line graph. The right Y-axis shows the percent of population that had a finance trade in the past 12 months in the sample data set, as indicated by the bar graph. The bar graph represents the finance attribute. Thus, graph 1200 shows that approximately 70% of the population had obtained 0 finance trades (a finance attribute of j) in the last 12 month, and of those 70%, just over 3% had a default "bad rate." The "bad rate" rises slightly for those with 1 finance trade in the last 12 months (a finance attribute of 1) and those with 2 or more trades (a finance attribute of 2+). The Pearson correlation coefficient for graph 1210 is –0.006. Pearson correlation coefficients are used to indicate the strength of a linear relationship between two variables, which in this example are the bad rate and the total number of personal finance trades.

Graph 1210 shows a leveled finance attribute generated by another embodiment of the present disclosure. This finance attribute is generated by using characteristics that focus on the "FP" code. The "bad rate" rises more dramatically for those in the population that have one or two more trades. The Pearson correlation coefficient for graph 1210 is –0.014, thereby showing a higher correlation between the number of personal finance trade and the bad rate in the graph 1210 than in the graph 1200. Therefore, the leveled finance attribute shown in graph 1210 demonstrates a greater correlation to credit risk than the non-leveled finance attribute shown in graph 1200.

FIG. 12B focuses on data obtained from another credit data source, credit bureau 2. Graph 1220 shows that approximately 90% of the population had obtained 0 finance trades (a finance attribute of 0) in the last 12 months, and of those 90%, just over 3% had a default "bad rate." The "bad rate" rises higher for those with 1 finance trade in the last 12 months (a finance attribute of 1) and even more for those with 2 or more trades (a finance attribute of 2+). The Pearson correlation coefficient for graph 1220 is –0.020.

Graph 1230 shows a leveled finance attribute where the "bad rate" rises less dramatically for those in the population that have one or two or more trades. The Pearson correlation coefficient for graph 1230 is –0.014, thereby showing a lower correlation between the number of personal finance trade and the bad rate in the graph 1230 than in the graph 1220. Therefore, the non-leveled finance attribute shown in graph 1220 demonstrates a greater correlation to credit risk than the leveled finance attribute shown in graph 1230.

FIG. 12C focuses on data obtained from another credit data source, credit bureau 3. Graph 1240 shows that approximately 76% of the population had obtained 0 finance trades (a finance attribute of 0) in the last 12 months, and of those 76%, just over 3% had a default "bad rate." The "bad rate" rises slightly higher for those with 1 finance trade in the last 12 months (a finance attribute of 1) and slightly more for those with 2 or more trades (a finance attribute of 2+). The Pearson correlation coefficient for graph 1220 is –0.006.

Graph 1250 shows a leveled finance attribute where the "bad rate" rises dramatically for those in the population that have one or two or more trades. The Pearson correlation coefficient for graph 1250 is –0.024, thereby showing a higher correlation between the number of personal finance trade and the bad rate in the graph 1250 than in the graph 1240. Therefore, the leveled finance attribute shown in graph 1250 demonstrates a greater correlation to credit risk than the unleveled finance attribute shown in graph 1240.

Figure 13:
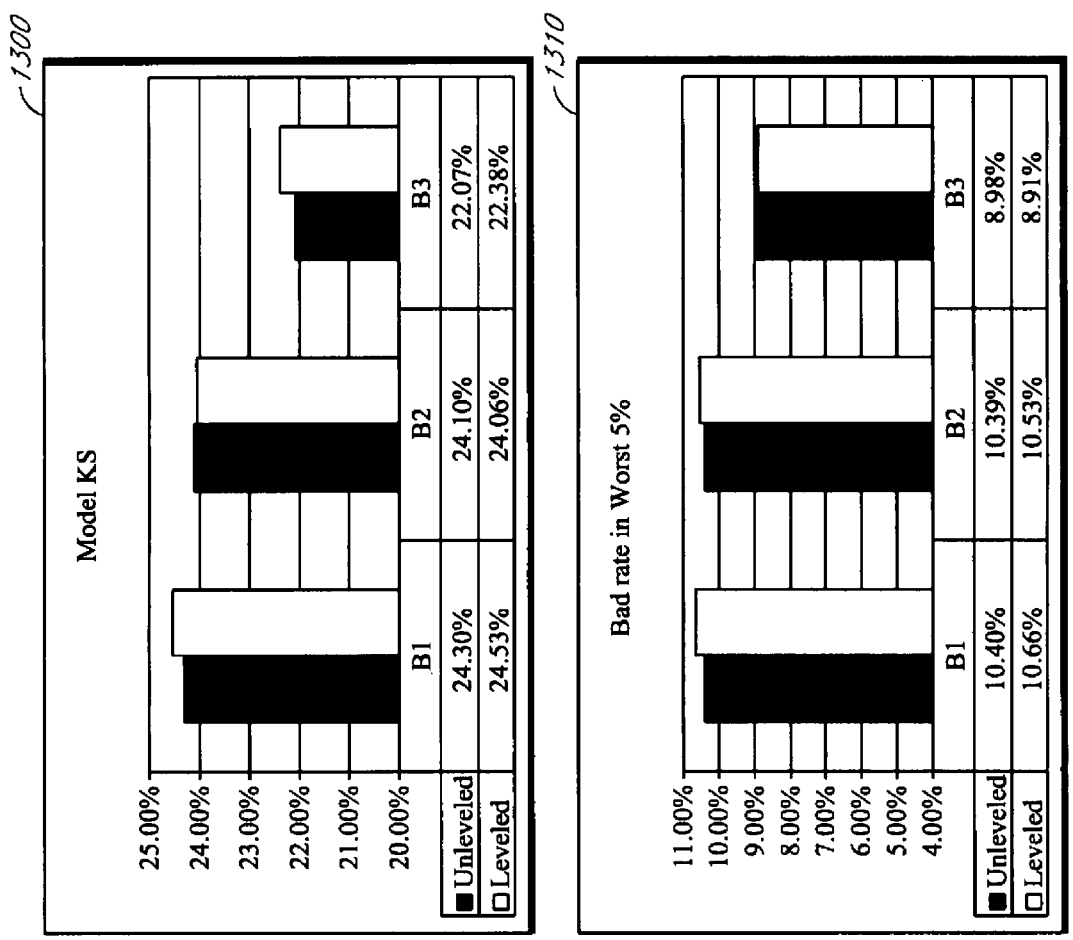
FIG. 13 shows the results of two financial models, that use finance attributes generated by a set of characteristics for leveling according to one embodiment.

As set forth above the leveled attribute may be used in one or more models wherein the model is applied to a set of data relating to one or more customers. In some embodiments, the models use a plurality of attributes to predict a characteristic, such as, for example, the risk level for one or more customers or the likelihood of bankruptcy for the one or more customers. FIG. 13 illustrates sample embodiments of a model that can be used to test an attribute. In FIG. 13, one version of the model used the unleveled finance attribute and another version of the model used the leveled finance attribute. Graph 1300 illustrates the testing of the finance attribute on Model KS (in one embodiment, modeled after Kolmogorov-Smirnov). KS is the maximum point difference between the cumulative distribution of "goods" and the cumulative distribution of "bads." In one embodiment, the "goods" represent data sample with low default risk/good repayment history while "bads" represent data sample with high default risk/poor repayment history. In one embodiment, the difference scale is shown along the Y-axis of graph 1300. In some embodiments, a high KS is desirable because it indicates a large separation between the good rate and the bad rate. Graph 1300 shows how the first Model KS graph measures alternative characteristics and check how the Model KS changes as the characteristics change.

The graph 1300 show that for B1 and B3, the model was better for the leveled attribute and slightly worse for B2. Graph 1310 illustrates another testing of the finance attribute using a model that predicts the bad rate in the worst 5% of a population. The numbers in FIGS. 12A-C reflect the sample population while the model shown in graph 1310 takes the worst 5% of the score range. By having a higher bad rate with the leveled definitions across the spectrum, this indicates that the model is pushing more bad to the bottom, which is an indication of a better performing model. As shown in the graph 1310, for B1 and B2, the model was better using the leveled attribute and just slightly worse for using B3. In one embodiment, an attribute can be further leveled until the difference between the non-leveled attribute and the leveled attribute exceeds a predetermined threshold for one or more of the data sources.

Although the foregoing invention has been described in terms of certain embodiments, other embodiments will be apparent to those of ordinary skill in the art from the disclosure herein. Moreover, the described embodiments have been presented by way of example only, and are not intended to limit the scope of the inventions. Indeed, the novel methods and systems described herein may be embodied in a variety of other forms without departing from the spirit thereof. Accordingly, other combinations, omissions, substitutions and modifications will be apparent to the skilled artisan in view of the disclosure herein.

What is claimed is:

1. A computer implemented method for generating an attribute from raw tradeline data from a plurality of credit bureaus, the method comprising:

retrieving raw tradeline data from each of the plurality of credit bureaus;

retrieving classification code data related to each of the plurality of credit bureaus, the classification code data being used to identify a source type of the raw tradeline data and being in a unique format for each of the credit bureaus;

determining one or more selected tradeline leveling characteristics, the selected tradeline leveling characteristics being used to select a portion of the raw tradeline data from each of the credit bureaus, the determining further comprising:

designating a set of classification code data from the classification code data related to each of the plurality of credit bureaus as the selected tradeline leveling characteristics used to select a portion of the raw tradeline data, the set including a minimum overlap in the classification code data for each of the plurality of credit bureaus;

applying the selected tradeline leveling characteristics to a sample set of the raw tradeline data to select a subset of the sample set of the raw tradeline data to generate respective leveled tradeline data indicating quantities of persons who meet a condition indicated by the respective leveled tradeline data;

determining if the respective leveled tradeline data for the plurality of credit bureaus meets a pre-defined correlation threshold, the determining comprising measuring the differences in the leveled tradeline data; and adjusting at least one of the selected tradeline leveling characteristics in response to determining that the correlation fails to meet the pre-defined threshold, the adjusting comprising at least one of: (1) narrowing the selected tradeline leveling characteristics for at least one of the credit bureaus to a smaller subset of the classification code data or (2) including additional classification code data for at least one of the credit bureaus not included in the set of classification code data; and generating an attribute using the selected tradeline leveling characteristics, the attribute indicating a quantity of persons who meet the condition, wherein the method is performed by a computing system that comprises one or more computing devices.

2. The computer implemented method of claim 1 wherein determining the one or more selected tradeline leveling characteristics further comprises:

excluding extraneous tradeline data from the leveled tradeline data;

repeating said applying, excluding, determining, and adjusting until the leveled tradeline data derived from the sample set of the raw tradeline data meets the at least one pre-defined correlation threshold.

3. The computer implemented method of claim 1 wherein the plurality of credit bureaus includes at least one of Experian, TransUnion or Equifax.

4. The computer implemented method of claim 1 wherein the classification code data includes industry code identifiers.

5. The computer implemented method of claim 1 wherein the selected tradeline leveling characteristics relate to finance data.

6. The computer implemented method of claim 1 wherein the raw tradeline data relates to at least data from a remote credit database.

7. The computer implemented method of claim 1 wherein the raw tradeline data relates to at least data from a local credit database.

8. The computer implemented method of claim 1 further comprising applying the attribute to individual finance data.

9. A non-transitory storage medium having a computer program stored thereon, the computer program comprising computer-program code for causing a suitably configured computing system to perform the following when the computer program is executed on the system:

retrieving raw tradeline data from each of the plurality of credit bureaus;

retrieving classification code data related to each of the plurality of credit bureaus, the classification code data being used to identify a source type of the raw tradeline data and being in a unique format for each of the credit bureaus;

determining one or more selected tradeline leveling characteristics, the selected tradeline leveling characteristics being used to select a portion of the raw tradeline data from each of the credit bureaus, the determining further comprising:

designating a set of classification code data from the classification code data related to each of the plurality of credit bureaus as the selected tradeline leveling characteristics used to select a portion of the raw tradeline data, the set including a minimum overlap in the classification code data for each of the plurality of credit bureaus;

applying the selected tradeline leveling characteristics to a sample set of the raw tradeline data to select a subset of the sample set of the raw tradeline data to generate respective leveled tradeline data indicating quantities of persons who meet a condition indicated by the respective leveled tradeline data;

determining if the respective leveled tradeline data for the plurality of credit bureaus meets a pre-defined correlation threshold, the determining comprising measuring the differences in the leveled tradeline data; and adjusting at least one of the selected tradeline leveling characteristics in response to determining that the correlation fails to meet the pre-defined threshold, the adjusting comprising at least one of: (1) narrowing the selected tradeline leveling characteristics for at least one of the credit bureaus to a smaller subset of the classification code data or (2) including additional classification code data for at least one of the credit bureaus not included in the set of classification code data; and generating an attribute using the selected tradeline leveling characteristics, the attribute indicating a quantity of persons who meet the condition.

10. A computing system comprising:

a computerized system comprising one or more computing devices configured to execute one or more modules comprising:
- a communications module configured to receive raw tradeline data related to a plurality of credit bureaus and to receive classification code data related to each of the plurality of credit bureaus, the classification code data being used to identify a source type of the raw tradeline data and being in a unique format for each of the credit bureaus;
- an attribute generation module configured to:
  - determine one or more selected tradeline leveling characteristics, the selected tradeline leveling characteristics being used to select a portion of the raw tradeline data from each of the credit bureaus, the attribute generation module configured to determine by:
    - designating a set of classification code data from the classification code data related to each of the plurality of credit bureaus as the selected tradeline leveling characteristics used to select a portion of the raw tradeline data, the set including a minimum overlap in the classification code data for each of the plurality of credit bureaus;
    - applying the selected tradeline leveling characteristics to a sample set of the raw tradeline data to select a subset of the sample set of the raw tradeline data to generate respective leveled tradeline data indicating quantities of persons who meet a condition indicated by the respective leveled tradeline data;
    - determining if the respective leveled tradeline data for the plurality of credit bureaus meets a pre-defined correlation threshold, the determining comprising measuring the differences in the leveled tradeline data; and
    - adjusting at least one of the selected tradeline leveling characteristics in response to determining that the correlation fails to meet the pre-defined threshold, the adjusting comprising at least one of: (1) narrowing the selected leveling characteristics for at least one of the credit bureaus to a smaller subset of the classification code data or (2) including additional classification code data for at least one of the credit bureaus not included in the set of classification code data; and
  - generate an attribute using the selected tradeline leveling characteristics, the attribute indicating a quantity of persons who meet the condition, and
- a processor module configured to execute the attribute generation module.

11. The computing system of claim 10 wherein the attribute generation module is further configured to determine one or more selected tradeline leveling characteristics by:
- excluding extraneous tradeline data from the leveled tradeline data;
- repeating said applying, excluding, determining, and adjusting until the leveled tradeline data derived from the sample set of the raw tradeline data meets the pre-defined correlation threshold.

12. The computing system of claim 10 wherein the raw tradeline data is received from at least an internal credit database.

13. The computing system of claim 10 wherein the raw tradeline data is received from at least an external credit database.

14. The computing system of claim 10 wherein the plurality of credit bureaus include at least one of Experian, TransUnion or Equifax.

15. The computing system of claim 10 wherein the classification code data includes industry code identifiers.

16. The computing system of claim 10 wherein the selected tradeline leveling characteristics relate to finance data.

17. The computing system of claim 10 wherein the attribute generation module is further configured to apply the finance attribute to individual finance data.

* * * * *

UNITED STATES PATENT AND TRADEMARK OFFICE
CERTIFICATE OF CORRECTION

PATENT NO. : 8,036,979 B1
APPLICATION NO. : 11/973300
DATED : October 11, 2011
INVENTOR(S) : Luz M. Torrez and Adam Thomas Kornegay It is certified that error appears in the above-identified patent and that said Letters Patent is hereby corrected as shown below:

At column 9, line 45, please delete "FIG.", and insert -- FIGS. --, therefor.

At column 11, line 49, please delete "of j)", and insert -- of 0) --, therefor.

At column 14, lines 13-14, Claim 2, after "the", please delete "at least one", therefor.

At column 16, line 42, Claim 17, after "the", please delete "finance", therefor.

Signed and Sealed this
Twelfth Day of June, 2012

David J. Kappos
*Director of the United States Patent and Trademark Office*